(12) United States Patent
Ko et al.

(10) Patent No.: US 12,150,088 B2
(45) Date of Patent: Nov. 19, 2024

(54) POSITIONING METHOD AND DEVICE USING SIDELINK RTT IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/620,512

(22) PCT Filed: Jun. 1, 2020

(86) PCT No.: PCT/KR2020/007062
§ 371 (c)(1),
(2) Date: Dec. 17, 2021

(87) PCT Pub. No.: WO2020/256311
PCT Pub. Date: Dec. 24, 2020

(65) Prior Publication Data
US 2022/0361142 A1 Nov. 10, 2022

(30) Foreign Application Priority Data
Jun. 17, 2019 (KR) .................. 10-2019-0071622

(51) Int. Cl.
*H04W 64/00* (2009.01)
*G01S 13/87* (2006.01)
(Continued)

(52) U.S. Cl.
CPC .......... *H04W 64/006* (2013.01); *G01S 13/87* (2013.01); *H04L 5/0051* (2013.01); *H04W 56/005* (2013.01); *H04W 92/18* (2013.01)

(58) Field of Classification Search
None
See application file for complete search history.

(56) References Cited

U.S. PATENT DOCUMENTS 9,237,546 B1 *  1/2016  Zhang .................. H04W 4/02
10,416,279 B2 *  9/2019  Handte ................ G01S 5/0226
(Continued)

FOREIGN PATENT DOCUMENTS

WO   WO-2016190806 A1 *  12/2016 ........... H04W 24/10
WO   2017043867             3/2017
(Continued)

OTHER PUBLICATIONS

PCT International Application No. PCT/KR2020/007062, International Search Report dated Sep. 9, 2020, 4 pages.
(Continued)

*Primary Examiner* — Ajit Patel
(74) *Attorney, Agent, or Firm* — LEE, HONG, DEGERMAN, KANG & WAIMEY

(57) ABSTRACT

Proposed is a method of operating a first terminal in a wireless communication system. The method may comprise: a step for transmitting a first PRS to a second terminal; a step for receiving a second PRS from the second terminal; a step for receiving a first time difference from the second terminal; and a step for determining a location of the first terminal on the basis of the first time difference and a second time difference.

13 Claims, 27 Drawing Sheets

(51) Int. Cl.
*H04L 5/00* (2006.01)
*H04W 56/00* (2009.01)
*H04W 92/18* (2009.01)

(56) References Cited

U.S. PATENT DOCUMENTS

| | | | | |
|---|---|---|---|---|
| 2005/0003828 | A1* | 1/2005 | Sugar | H04W 24/00 455/422.1 |
| 2013/0316727 | A1 | 11/2013 | Edge | |
| 2014/0204793 | A1* | 7/2014 | Ben-Haim | H04L 7/0033 370/253 |
| 2016/0095080 | A1* | 3/2016 | Khoryaev | G01S 5/0284 455/456.1 |
| 2016/0095092 | A1* | 3/2016 | Khoryaev | G01S 5/0289 370/329 |
| 2016/0274229 | A1* | 9/2016 | Oh | G01S 19/24 |
| 2018/0231648 | A1 | 8/2018 | Zhang | |
| 2019/0150148 | A1 | 5/2019 | Ouchi et al. | |
| 2021/0007075 | A1* | 1/2021 | Small | G01S 1/24 |

FOREIGN PATENT DOCUMENTS

| | | | |
|---|---|---|---|
| WO | 2018068817 | 4/2018 | |
| WO | WO-2020064120 A1 * | 4/2020 | G01S 5/00 |

OTHER PUBLICATIONS

3rd Generation Partnership Project; Technical Specification Group Radio Access Network; Evolved Universal Terrestrial Radio Access (E-UTRA); LTE Positioning Protocol (LPP) (Release 15), 3GPP TS 36.355 V15.3.0, Mar. 2019, 223 pages.

* cited by examiner

FIG. 4
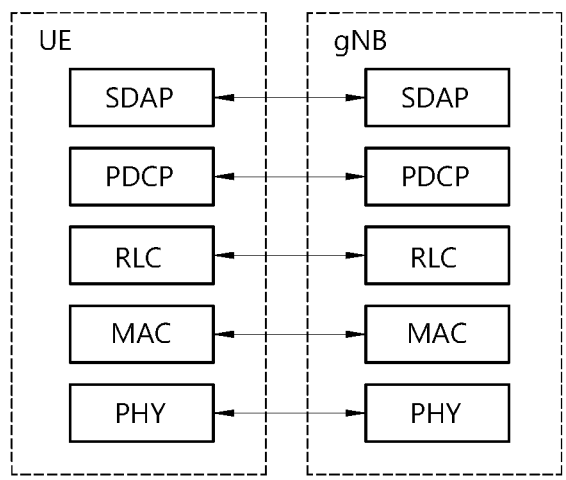
(a)
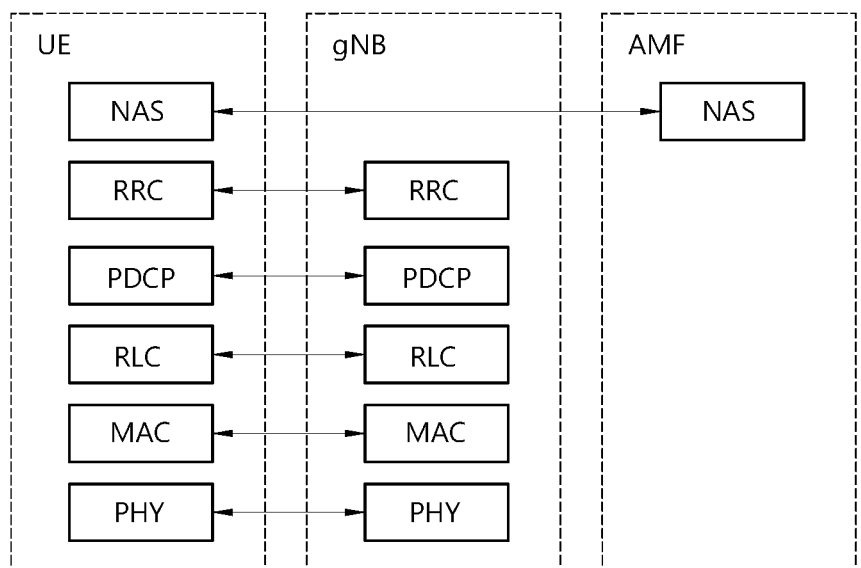
(b)

FIG. 8
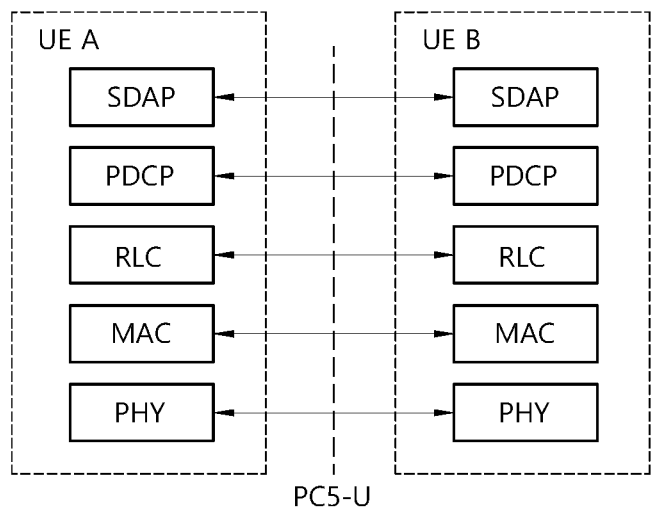
(a)
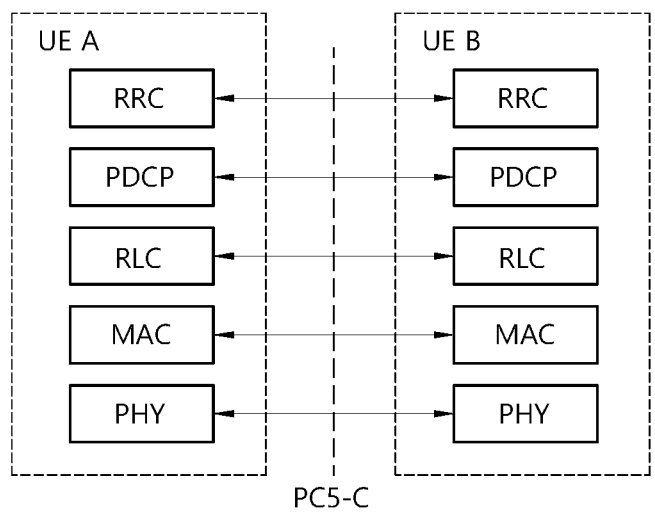
(b)

POSITIONING METHOD AND DEVICE USING SIDELINK RTT IN NR V2X

CROSS-REFERENCE TO RELATED APPLICATIONS

This application is the National Stage filing under 35 U.S.C. 371 of International Application No. PCT/KR2020/007062, filed on Jun. 1, 2020, which claims the benefit of earlier filing date and right of priority to Korean Application No. 10-2019-0071622, filed on Jun. 17, 2019, the contents of which are all hereby incorporated by reference herein their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

In one embodiment, a method of operating a first user equipment (UE) in a wireless communication system is proposed. The method includes: transmitting a first PRS to a second UE; receiving a second PRS from the second UE; receiving a first time difference from the second UE; and determining the location of the first UE based on the first time difference and the second time difference.

Effects of the Disclosure

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
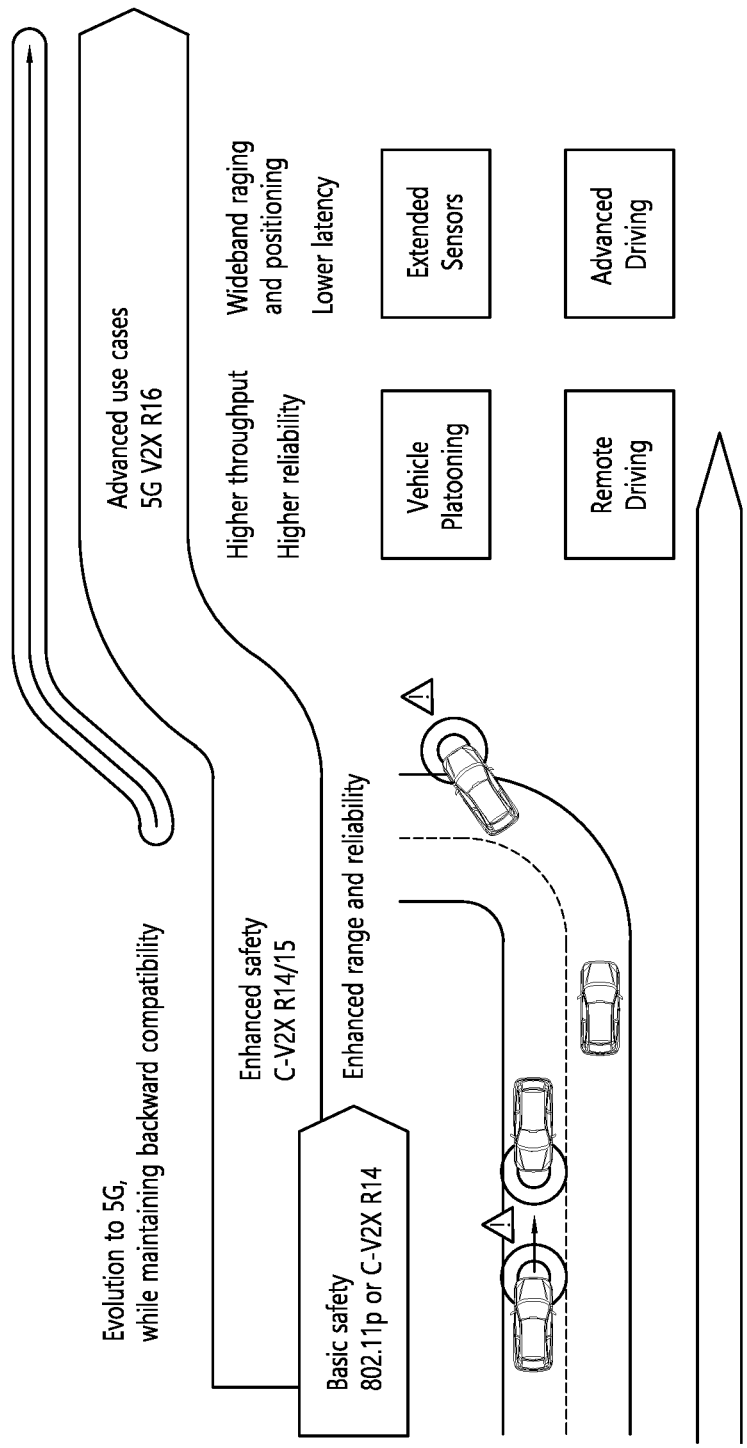
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
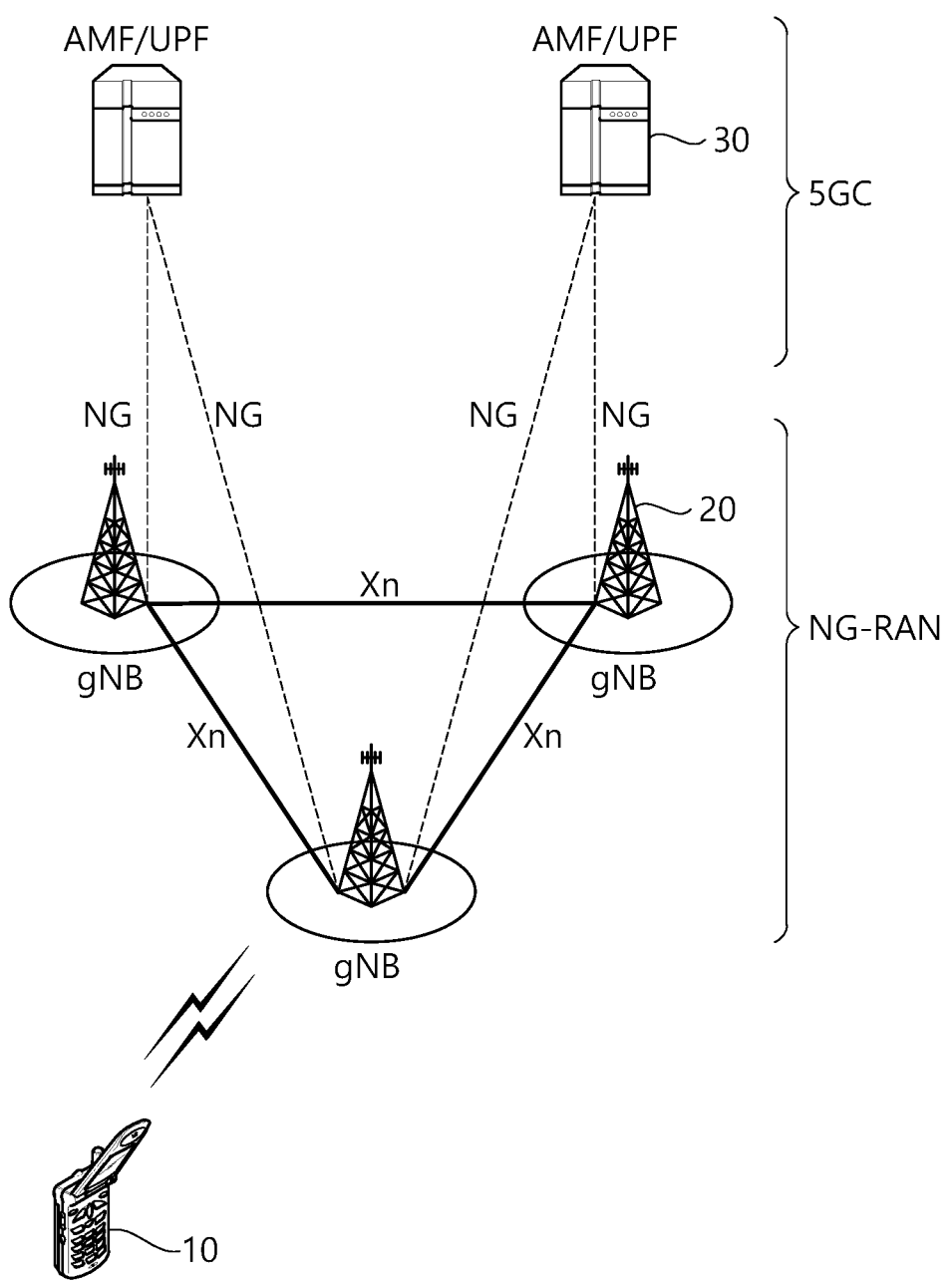
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
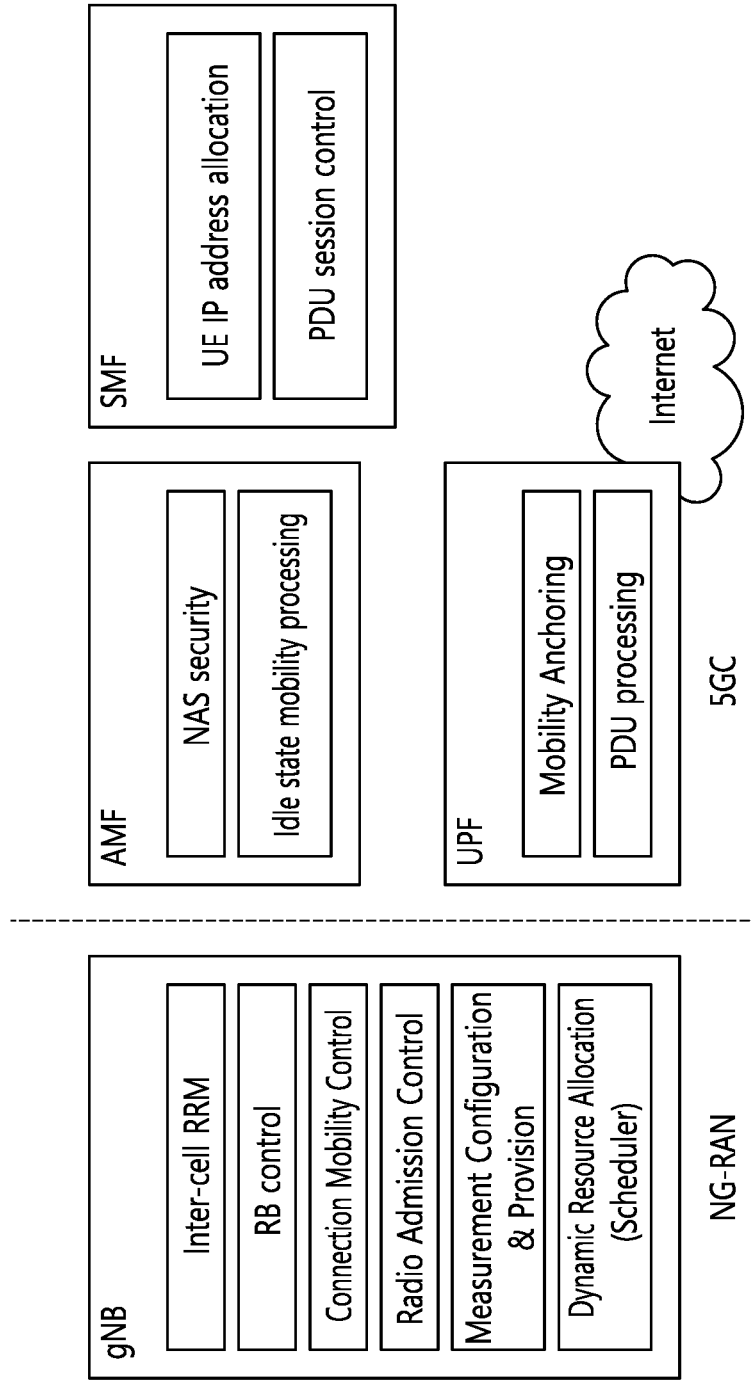
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
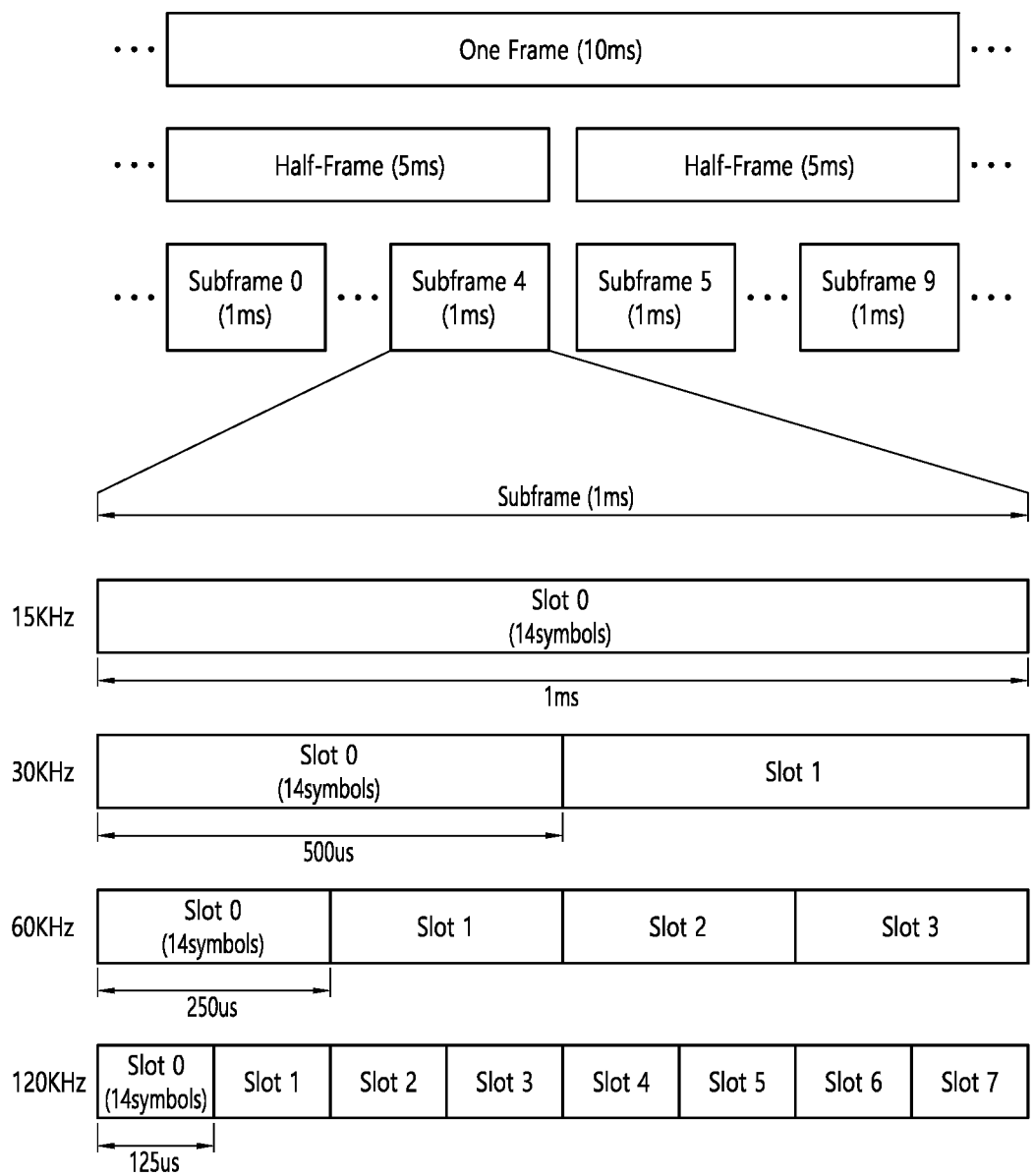
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number of slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
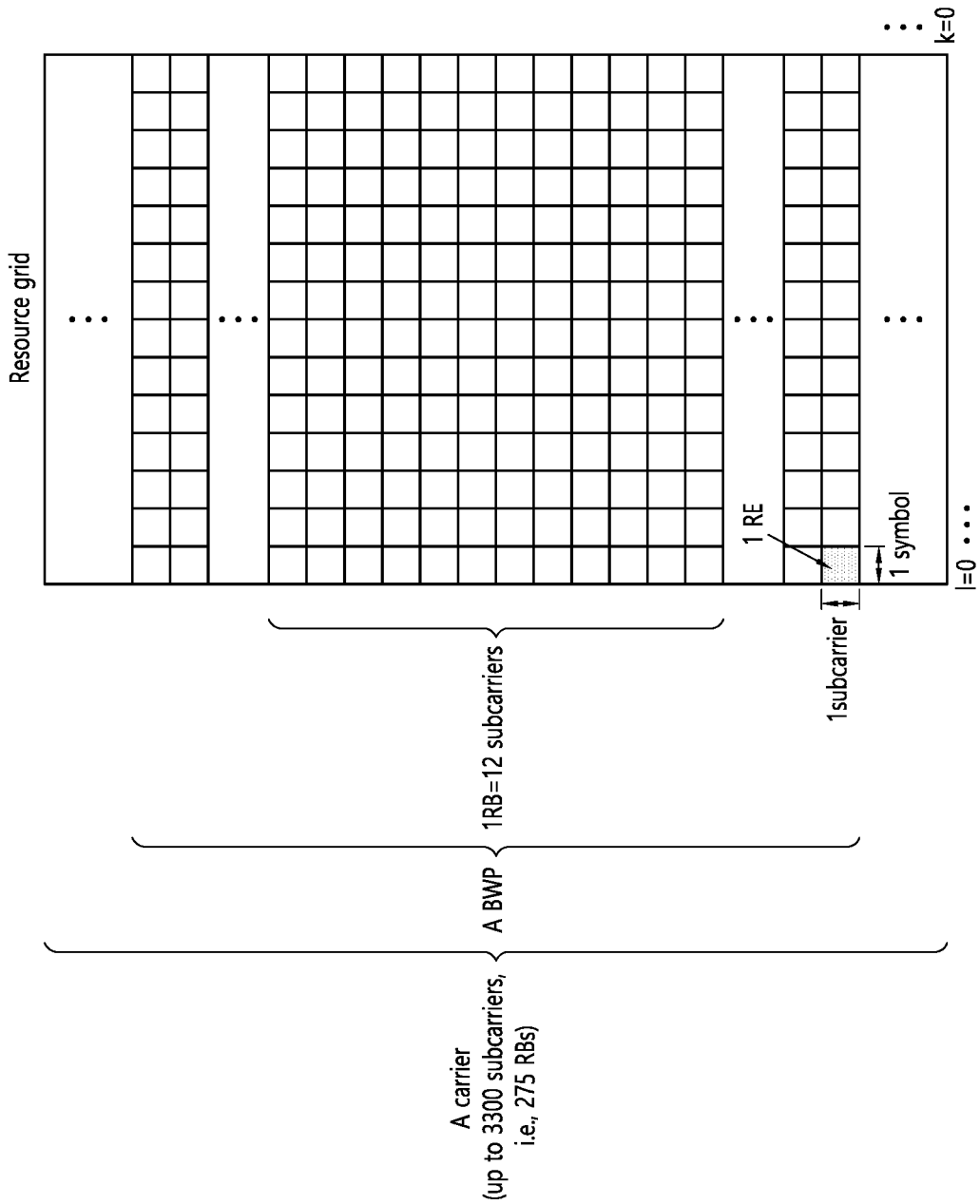
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
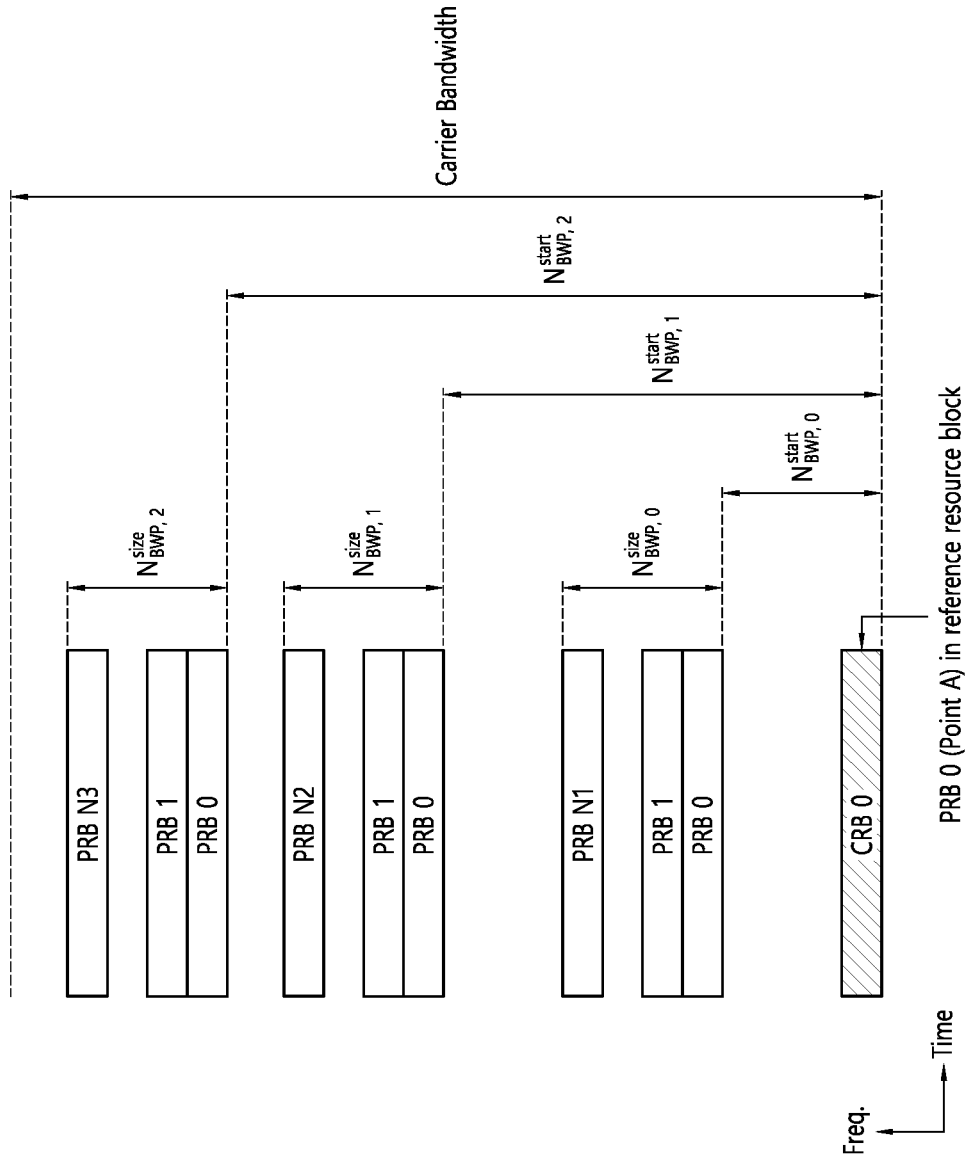
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
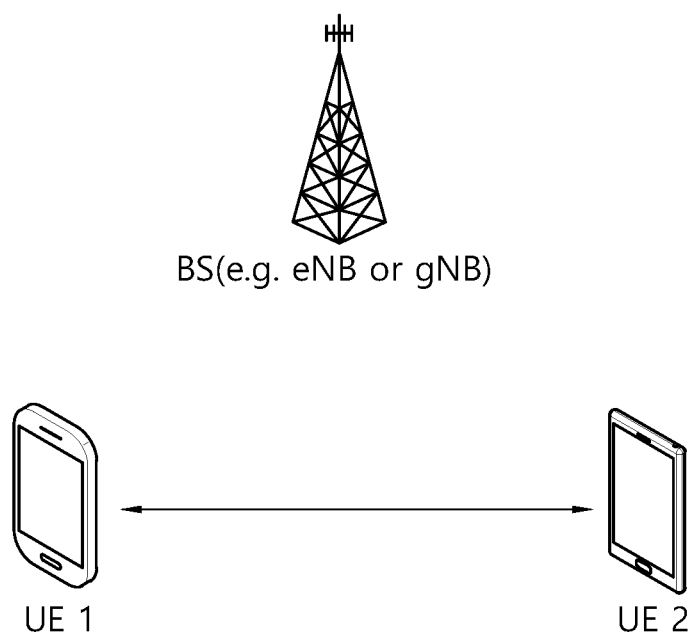
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
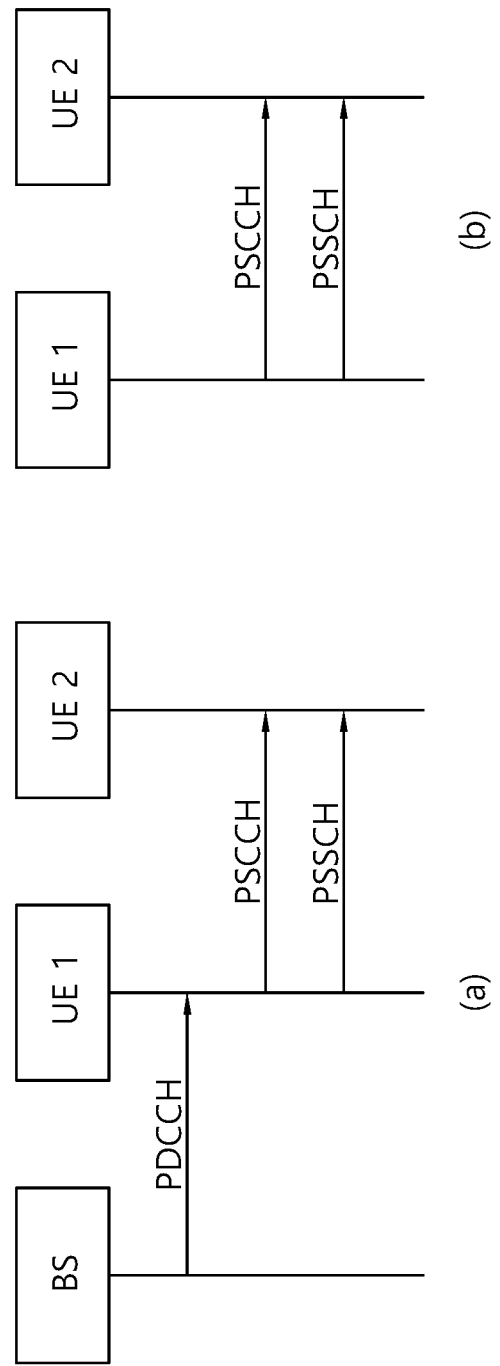
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
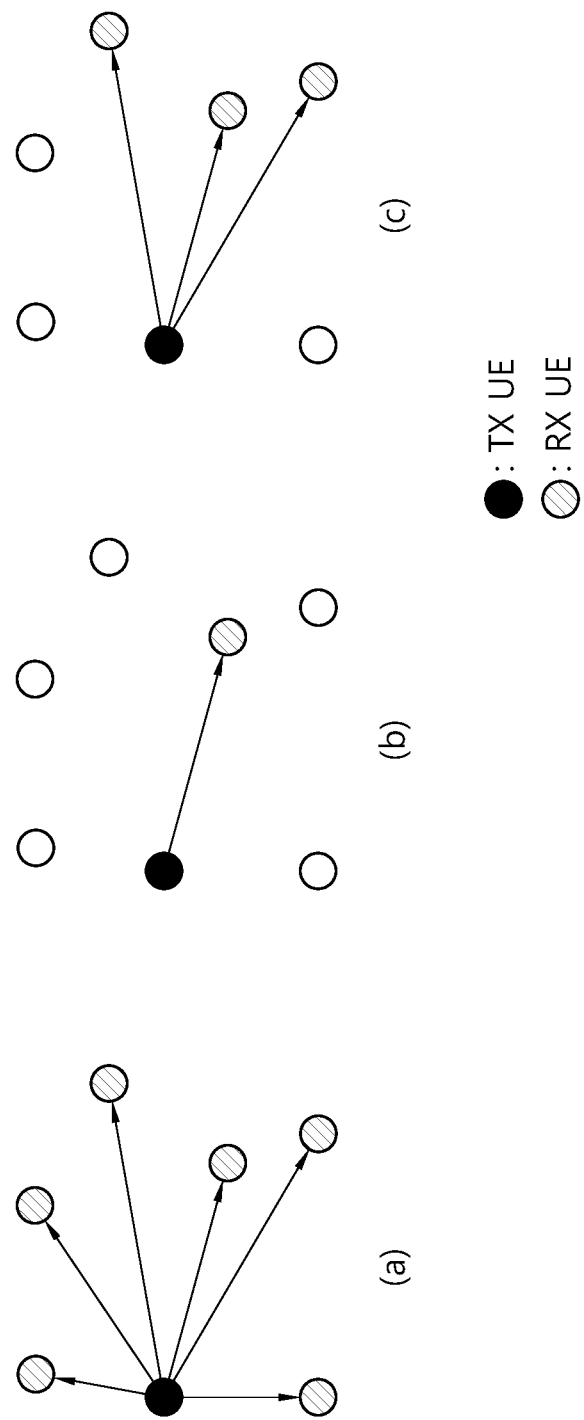
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in a next generation system, various usage cases may be supported. For example, services for communication of self-driving vehicles, smart cars or connected cars, and so on, may be considered. For such services, each vehicle may receive and send (or transmit) information as a user equipment capable of performing communication. And, depending upon the circumstances, each vehicle may select resources for communication with the help (or assistance) of the base station or without any help (or assistance) of the base station and transmit and receive messages to and from other UEs.

Figure 12:
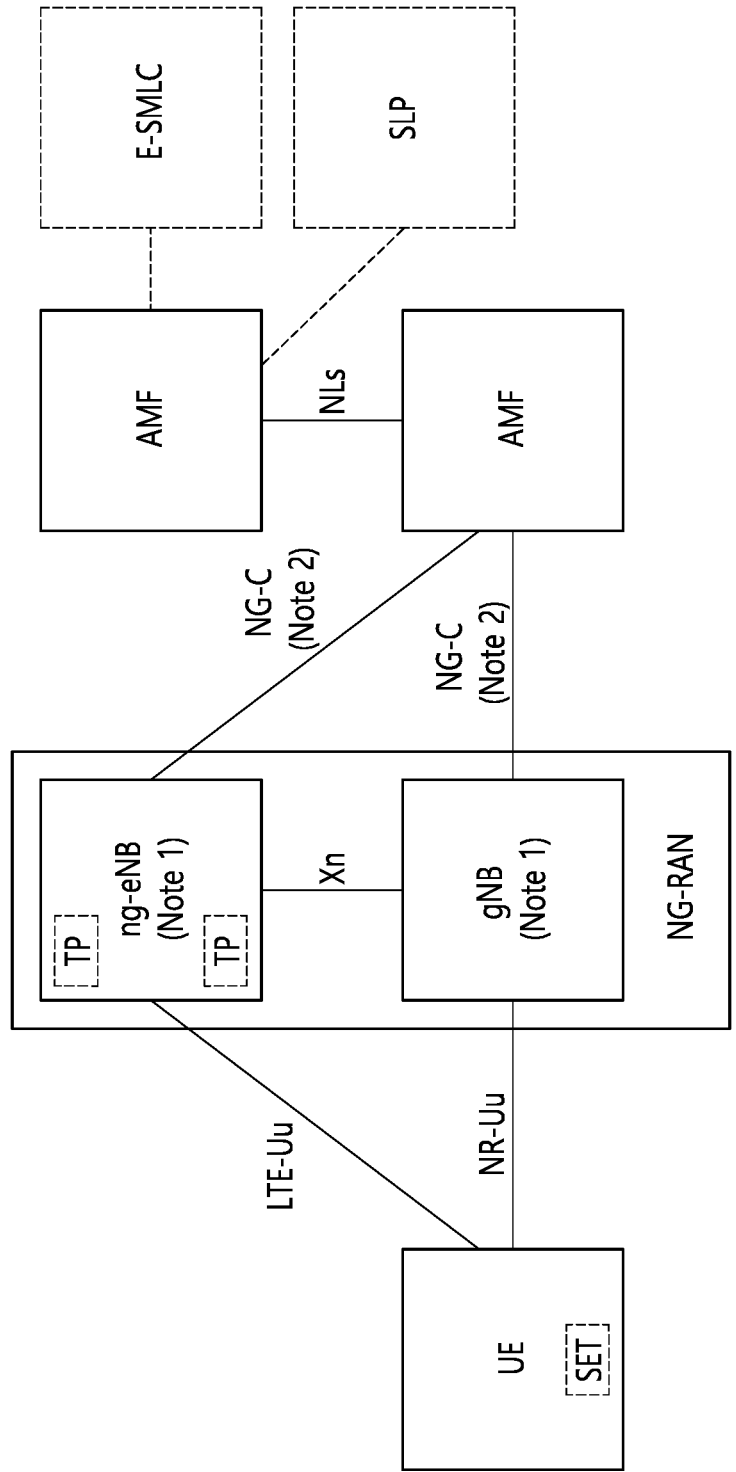
FIG. 12 shows an example of an architecture of a 5G system capable of positioning a UE having access to a next generation-radio access network (NG-RAN) or an E-UTRAN based on an embodiment of the present disclosure.

FIG. 12 shows an example of an architecture of a 5G system capable of positioning a UE having access to a next generation-radio access network (NG-RAN) or an E-UTRAN based on an embodiment of the present disclosure.

Referring to FIG. 12, an AMF may receive a request for a location service related to a specific target UE from a different entity such as a gateway mobile location center (GMLC), or may determine to start the location service in the AMF itself instead of the specific target UE. Then, the AMF may transmit a location service request to a location management function (LMF). Upon receiving the location service request, the LMF may process the location service request and return a processing request including an estimated location or the like of the UE to the AMF. Meanwhile, if the location service request is received from the different entity such as GMLC other than the AMF, the AMF may transfer to the different entity the processing request received from the LMF.

A new generation evolved-NB (ng-eNB) and a gNB are network elements of NG-RAN capable of providing a measurement result for location estimation, and may measure a radio signal for a target UE and may transfer a resultant value to the LMF. In addition, the ng-eNB may control several transmission points (TPs) such as remote radio heads or PRS-dedicated TPs supporting a positioning reference signal (PRS)-based beacon system for E-UTRA.

The LMF may be connected to an enhanced serving mobile location center (E-SMLC), and the E-SMLC may allow the LMF to access E-UTRAN. For example, the E-SMLC may allow the LMF to support observed time difference of arrival (OTDOA), which is one of positioning methods of E-UTRAN, by using downlink measurement obtained by a target UE through a signal transmitted from the gNB and/or the PRS-dedicated TPs in the E-UTRAN.

Meanwhile, the LMF may be connected to an SUPL location platform (SLP). The LMF may support and manage different location determining services for respective target UEs. The LMF may interact with a serving ng-eNB or serving gNB for the target UE to obtain location measurement of the UE. For positioning of the target UE, the LMF may determine a positioning method based on a location service (LCS) client type, a requested quality of service (QoS), UE positioning capabilities, gNB positioning capabilities, and ng-eNB positioning capabilities, or the like, and may apply such a positioning method to the serving gNB and/or the serving ng-eNB. In addition, the LMF may determine additional information such as a location estimation value for the target UE and accuracy of location estimation and speed. The SLP is a secure user plane location (SUPL) entity in charge of positioning through a user plane.

The UE may measure a downlink signal through NG-RAN, E-UTRAN, and/or other sources such as different global navigation satellite system (GNSS) and terrestrial beacon system (TBS), wireless local access network (WLAN) access points, Bluetooth beacons, UE barometric pressure sensors or the like. The UE may include an LCS application. The UE may communicate with a network to which the UE has access, or may access the LCS application through another application included in the UE. The LCS application may include a measurement and calculation function required to determine a location of the UE. For example, the UE may include an independent positioning function such as a global positioning system (GPS), and may report the location of the UE independent of NG-RAN transmission. Positioning information obtained independently as such may be utilized as assistance information of the positioning information obtained from the network.

Figure 13:
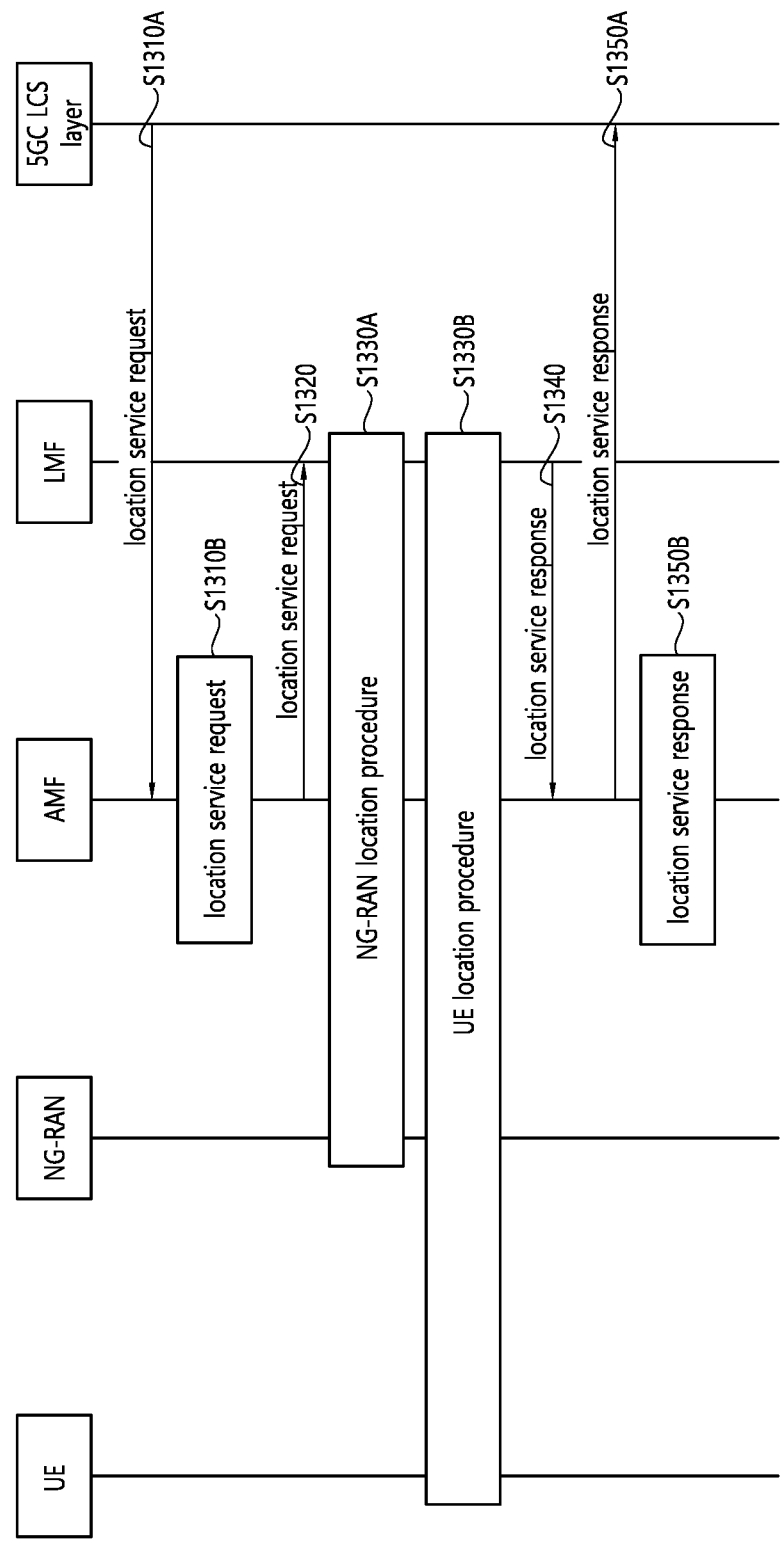
FIG. 13 shows an example of implementing a network for measuring a location of a UE based on an embodiment of the present disclosure.

FIG. 13 shows an example of implementing a network for measuring a location of a UE based on an embodiment of the present disclosure.

When the UE is in a connection management (CM)-IDLE state, if an AMF receives a location service request, the AMF may establish a signaling connection with the UE, and may request for a network trigger service to allocate a specific serving gNB or ng-eNB. Such an operational process is omitted in FIG. 13. That is, it may be assumed in FIG. 13 that the UE is in a connected mode. However, due to signaling and data inactivation or the like, the signaling connection may be released by NG-RAN while a positioning process is performed.

A network operation process for measuring a location of a UE will be described in detail with reference to FIG. 13. In step S1310A, a 5GC entity such as GMLC may request a serving AMF to provide a location service for measuring a location of a target UE. However, even if the GMLC does not request for the location service, based on step S1310B, the serving AMF may determine that the location service for measuring the location of the target UE is required. For example, to measure the location of the UE for an emergency call, the serving AMF may determine to directly perform the location service.

Thereafter, the AMF may transmit the location service request to an LMF based on step S1320, and the LMF may start location procedures to obtain location measurement data or location measurement assistance data together with a serving ng-eNB and a serving gNB, according to step S1330A. Additionally, based on step S1330B, the LMF may start location procedures for downlink positioning together with the UE. For example, the LMF may transmit assistance data defined in 3GPP TS 36.355, or may obtain a location estimation value or a location measurement value. Meanwhile, step S1330B may be performed additionally after step S1330A is performed, or may be performed instead of step S1330A.

In step S1340, the LMF may provide a location service response to the AMF. In addition, the location service response may include information on whether location estimation of the UE is successful and a location estimation value of the UE. Thereafter, if the procedure of FIG. 13 is initiated by step S1310A, the AMF may transfer the location service response to a 5GC entity such as GMLC, and if the procedure of FIG. 13 is initiated by step S1310B, the AMF may use the location service response to provide a location service related to an emergency call or the like.

Figure 14:
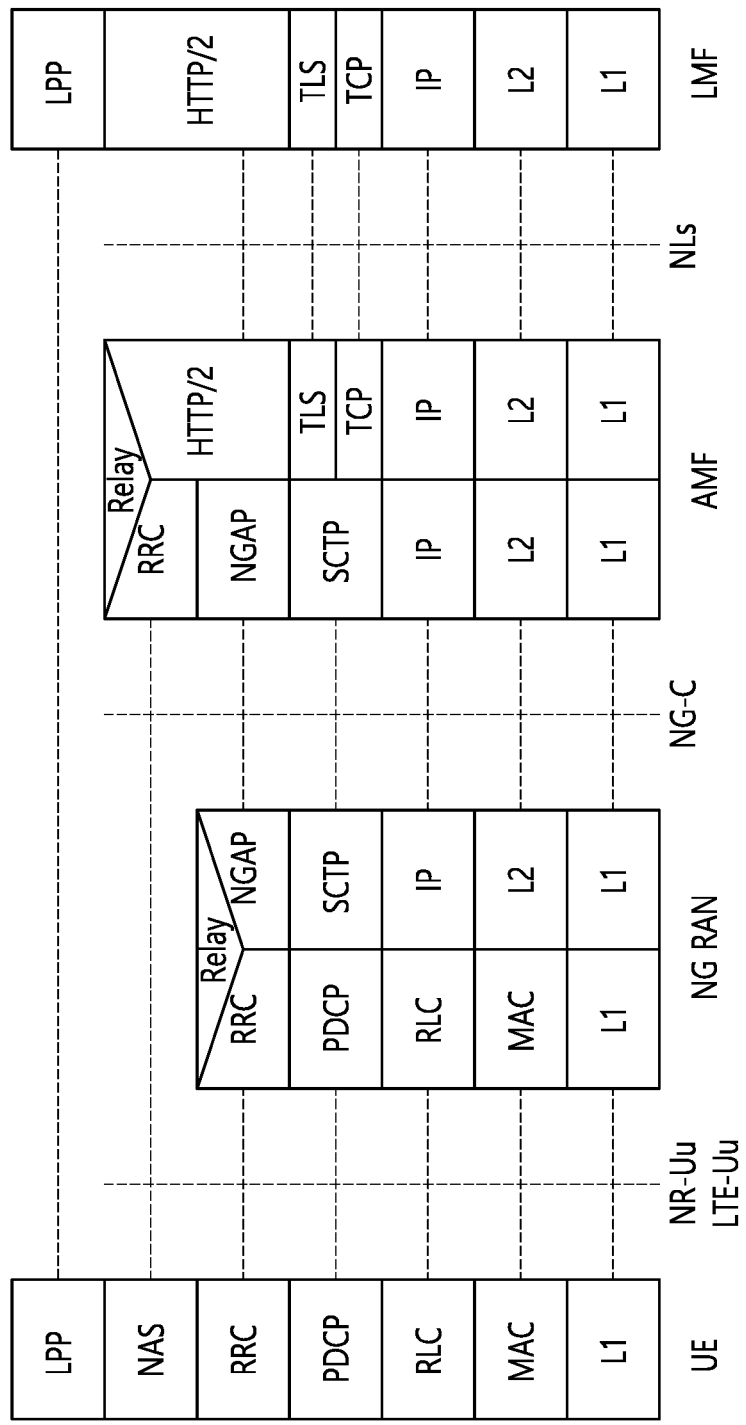
FIG. 14 shows an example of a protocol layer used to support LTE positioning protocol (LPP) message transmission between an LMF and a UE based on an embodiment of the present disclosure.

FIG. 14 shows an example of a protocol layer used to support LTE positioning protocol (LPP) message transmission between an LMF and a UE based on an embodiment of the present disclosure.

An LPP PDU may be transmitted through a NAS PDU between an AMF and the UE. Referring to FIG. 14, an LPP may be terminated between a target device (e.g., a UE in a control plane or an SUPL enabled terminal (SET) in a user plane) and a location server (e.g., an LMF in the control plane and an SLP in the user plane). The LPP message may be transferred in a form of a transparent PDU through an intermediary network interface by using a proper protocol such as an NG application protocol (NGAP) through an NG-control plane (NG-C) interface and NAS/RRC or the like through an NR-Uu interface. The LPP protocol may enable positioning for NR and LTE by using various positioning methods.

For example, based on the LPP protocol, the target device and the location server may exchange mutual capability information, assistance data for positioning, and/or location information. In addition, an LPP message may be used to indicate exchange of error information and/or interruption of the LPP procedure.

Figure 15:
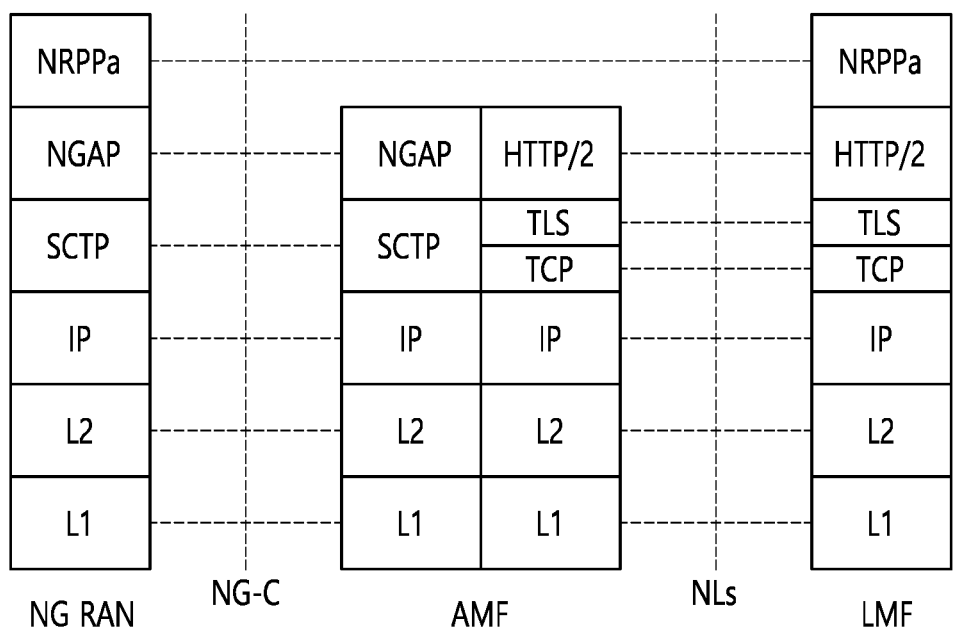
FIG. 15 shows an example of a protocol layer used to support NR positioning protocol A (NRPPa) PDU transmission between an LMF and an NG-RAN node based on an embodiment of the present disclosure.

FIG. 15 shows an example of a protocol layer used to support NR positioning protocol A (NRPPa) PDU transmission between an LMF and an NG-RAN node based on an embodiment of the present disclosure.

The NRPPa may be used for information exchange between the NG-RAN node and the LMF. Specifically, the NRPPa may exchange an enhanced-cell ID (E-CID) for measurement, data for supporting an OTDOA positioning method, and a cell-ID, cell location ID, or the like for an NR cell ID positioning method, transmitted from the ng-eNB to the LMF. Even if there is no information on an associated NRPPa transaction, the AMF may route NRPPa PDUs based on a routing ID of an associated LMR through an NG-C interface.

A procedure of an NRPPa protocol for location and data collection may be classified into two types. A first type is a UE associated procedure for transferring information on a specific UE (e.g., location measurement information or the like), and a second type is a non UE associated procedure for transferring information (e.g., gNB/ng-eNB/TP timing information, etc.) applicable to an NG-RAN node and associated TPs. The two types of the procedure may be independently supported or may be simultaneously supported.

Meanwhile, examples of positioning methods supported in NG-RAN may include GNSS, OTDOA, enhanced cell ID (E-CID), barometric pressure sensor positioning, WLAN positioning, Bluetooth positioning and terrestrial beacon system (TBS), uplink time difference of arrival (UTDOA), etc.

(1) OTDOA (Observed Time Difference Of Arrival)

Figure 16:
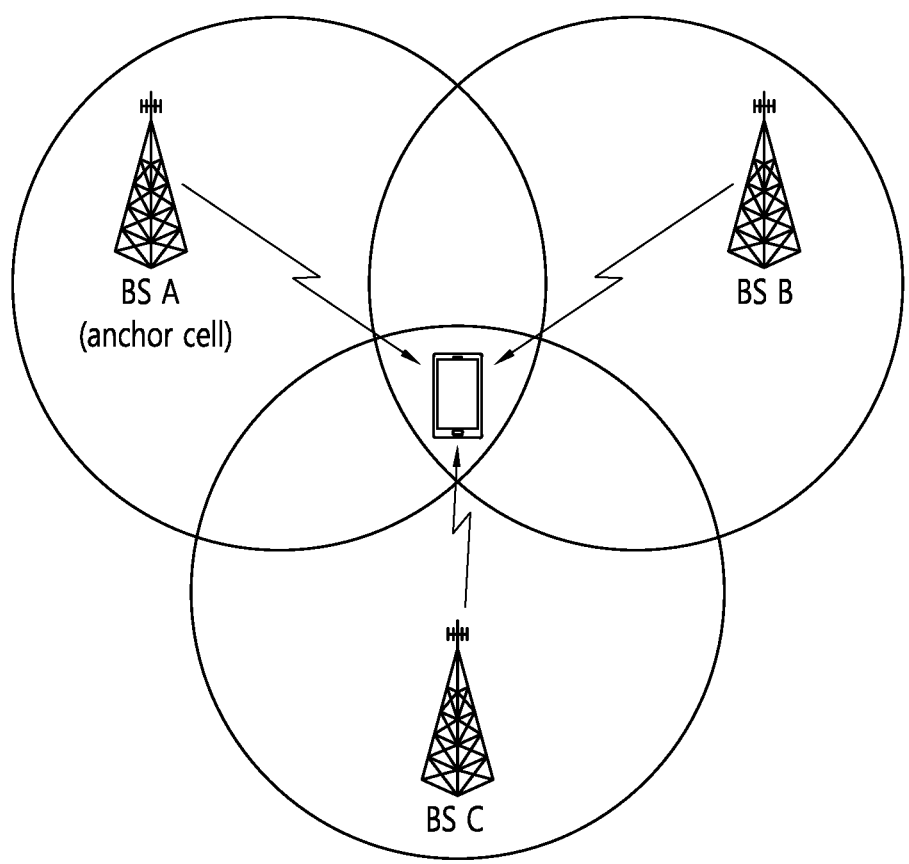
FIG. 16 is a drawing for explaining an OTDOA positioning method based on an embodiment of the present disclosure.

FIG. 16 is a drawing for explaining an OTDOA positioning method based on an embodiment of the present disclosure.

The OTDOA positioning method uses measurement timing of downlink signals received by a UE from an eNB, an ng-eNB, and a plurality of TPs including a PRS-dedicated TP. The UE measures timing of downlink signals received by using location assistance data received from a location server. In addition, a location of the UE may be determined based on such a measurement result and geometric coordinates of neighboring TPs.

A UE connected to a gNB may request for a measurement gap for OTDOA measurement from the TP. If the UE cannot recognize a single frequency network (SFN) for at least one TP in the OTDOA assistance data, the UE may use an autonomous gap to obtain an SNF of an OTDOA reference cell before the measurement gap is requested to perform reference signal time difference (RSTD) measurement.

Herein, the RSTD may be defined based on a smallest relative time difference between boundaries of two subframes received respectively from a reference cell and a measurement cell. That is, the RSTD may be calculated based on a relative time difference between a start time of a subframe received from the measurement cell and a start time of a subframe of a reference cell closest to the start time of the subframe received from the measurement cell. Meanwhile, the reference cell may be selected by the UE.

For correct OTDOA measurement, it may be necessary to measure a time of arrival (TOA) of a signal received from three or more TPs or BSs geometrically distributed. For example, a TOA may be measured for each of a TP1, a TP2, and a TP3, and RSTD for TP 1-TP 2, RSTD for TP 2-TP 3, and RSTD for TP 3-TP 1 may be calculated for the three TOAs. Based on this, a geometric hyperbola may be determined, and a point at which these hyperbolas intersect may be estimated as a location of a UE. In this case, since accuracy and/or uncertainty for each TOA measurement may be present, the estimated location of the UE may be known as a specific range based on measurement uncertainty.

For example, RSTD for two TPs may be calculated based on Equation 1.

$$RSTDi, 1 = \frac{\sqrt{(x_t - x_i)^2 (y_t - y_i)^2}}{c} - \frac{\sqrt{(x_t - x_1)^2 (y_t - y_1)^2}}{c} + (T_i - T_1) + (n_i - n_1) \quad \text{[Equation 1]}$$

Herein, c may be the speed of light, $\{x_t, y_t\}$ may be a (unknown) coordinate of a target UE, $\{x_i, y_i\}$ may be a coordinate of a (known) TP, and $\{x_1, y_1\}$ may be a coordinate of a reference TP (or another TP). Herein, $(T_i-T_1)$ may be referred to as "real time differences (RTDs)" as a transmission time offset between two TPs, and $n_i$, $n_1$ may represent values related to UE TOA measurement errors.

(2) E-CID (Enhanced Cell ID)

In a cell ID (CID) positioning method, a location of a UE may be measured through geometric information of a serving ng-eNB, serving gNB, and/or serving cell of the UE. For example, the geometric information of the serving ng-eNB, serving gNB, and/or serving cell may be obtained through paging, registration, or the like.

Meanwhile, in addition to the CID positioning method, an E-CID positioning method may use additional UE measurement and/or NG-RAN radio resources or the like to improve a UE location estimation value. In the E-CID positioning method, although some of the measurement methods which are the same as those used in a measurement control system of an RRC protocol may be used, additional measurement is not performed in general only for location measurement of the UE. In other words, a measurement configuration or a measurement control message may not be provided additionally to measure the location of the UE. Also, the UE may not expect that an additional measurement operation only for location measurement will be requested, and may report a measurement value obtained through measurement methods in which the UE can perform measurement in a general manner.

For example, the serving gNB may use an E-UTRA measurement value provided from the UE to implement the E-CID positioning method.

Examples of a measurement element that can be used for E-CID positioning may be as follows.

UE measurement: E-UTRA reference signal received power (RSRP), E-UTRA reference signal received quality (RSRQ), UE E-UTRA Rx-Tx Time difference, GSM EDGE random access network (GERAN)/WLAN reference signal strength indication (RSSI), UTRAN common pilot channel (CPICH) received signal code power (RSCP), UTRAN CPICH Ec/Io E-UTRAN measurement: ng-eNB Rx-Tx Time difference, timing advance (TADV), angle of arrival (AoA)

Herein, the TADV may be classified into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

Meanwhile, AoA may be used to measure a direction of the UE. The AoA may be defined as an estimation angle with respect to the location of the UE counterclockwise from a BS/TP. In this case, a geographic reference direction may be north. The BS/TP may use an uplink signal such as a sounding reference signal (SRS) and/or a demodulation reference signal (DMRS) for AoA measurement. In addition, the larger the arrangement of the antenna array, the higher the measurement accuracy of the AoA. When the antenna arrays are arranged with the same interval, signals received from adjacent antenna elements may have a constant phase-rotate.

(3) UTDOA (Uplink Time Difference of Arrival)

UTDOA is a method of determining a location of a UE by estimating an arrival time of SRS. When calculating an estimated SRS arrival time, the location of the UE may be estimated through an arrival time difference with respect to another cell (or BS/TP) by using a serving cell as a reference cell. In order to implement the UTDOA, E-SMLC may indicate a serving cell of a target UE to indicate SRS transmission to the target UE. In addition, the E-SMLC may provide a configuration such as whether the SRS is periodical/aperiodical, a bandwidth, frequency/group/sequence hopping, or the like.

The existing service for measuring the location of a UE is performed by a location service (LCS) server. That is, when a UE, a MME (Mobility Management Entity) and/or an LCS server wants to measure the location of a specific UE, finally, the UE and/or the MME requests the LCS server to provide a location measurement service of the UE, and the LCS server requests a base station to perform a process of measuring the location of the UE in order to perform this request. In this case, the LCS server configures a PRS (Positioning Reference Signal) related parameter transmitted by the base station or the UE for position measurement. In position estimation through DL transmission, as a plurality of base stations transmit the PRS, and a UE feeds back a difference in reception time of the PRS transmitted from each base station to an LCS server, the LCS server can finally estimate the location of the UE. In position estimation through UL transmission, as a UE transmits a SRS to a plurality of base stations, and each base station transmits the reception time of the SRS transmitted from the UE to an LCS server, the LCS server can finally estimate the location of the UE. Alternatively, as a UE feeds back received power of an RS received from a base station using a cell identification (ID) of a cell in which the base station is included to an LCS server, the LCS server can roughly estimate the distance the UE is away from the base station.

The existing technology is a technique for estimating a location of a UE based on a core network including an LCS server and MME that manages location estimation of a UE, and a random access network (RAN) including a plurality of base stations and TPs (Transmission Points), a Uu interface connecting the UE and the base station must be used, and the UE must exist within the coverage of the base station. However, if a UE is in an area outside the coverage of a base station or without the assistance of a base station, it is impossible to estimate the location of the UE based on the communication between the UEs. The present disclosure proposes a technique for estimating the location of a UE without the aid of a base station or an LCS server, based on an operation between UEs.

A user equipment (UE) includes a mobile device, a V2X module, an IoT device, or a UE-type Road Side Unit (RSU). In the present disclosure, a UE is divided into two types of roles from the viewpoint of positioning service, a target UE is defined as a UE that is a target of location estimation, and a server UE is defined as a UE that performs an operation that helps to estimate the location of the target UE. In sidelink positioning, the location of a UE can be estimated only through the operation between a target UE and a server UE, and other entities participating in the existing positioning technology based on the Uu interface such as MME, LCS server, and base station may not be required.

In the present disclosure, as a method of sidelink positioning for estimating the location of a UE through communication only between a target UE and a server UE without the aid of a base station and an LCS server, an SL RTT technique is proposed in which a target UE and a server UE exchange a signal (hereinafter, PRS) for positioning and measure a round trip time (RTT) to measure a distance between the target UE and the server UE. For example, the PRS may include a Reference Signal, DM-RS of PSCCH/PSSCH/PSFCH, S-SSB/PSS/SSS, and/or DM-RS of PSBCH. In addition, a PRS may be transmitted in a stand-alone mode in a preconfigured form, or may be transmitted in a non-standalone mode together with an S-SSB or PSCCH/PSSCH.

An SL RTT-based positioning is divided into a Single-Server-based S-RTT and a Multi-Server-based S-RTT method described below.

1) Single-Server-Based S-RTT 1.1) A Target UE Requests to Participate in S-RTT to an Object UE to Measure the Distance to Itself For example, a target UE transmits an S-RTT participation request to an object UE through a higher layer SPP (SL positioning protocol) message on a control plane or a user plane, or signals to the object UE the request through a PSCCH, a PC5 RRC, and/or MAC CE the target UE transmits.

Alternatively, for example, a target UE may reduce the latency required for performing S-RTT by transmitting a PRS to an object UE from the beginning without any request for participation to the object UE.

1.2) An Object UE Accepts or Rejects an S-RTT Request

For example, an object UE may measure reference signal received power (RSRP) for PSCCH/PSSCH/PSBCH DMRS transmitted by a target UE. Here, if the measured value is below a (pre)configured threshold value, the object UE may determine that the distance between the target UE and the object UE is too far to be conducive to S-RTT participation, and may reject the S-RTT request.

Alternatively, for example, an object UE may reject the S-RTT request if the priority of the service provided or provided by the object UE by allocating resources is higher than the priority of the service a target UE intends to provide or receive through S-RTT.

Alternatively, for example, by considering the reliability of its location, an object UE may determine that it does not know its location accurately enough if the reliability of its location is below a (pre)configured threshold, and mat reject the S-RTT request.

Alternatively, for example, if the utilization ratio of the transmission channel is greater than the (pre)configured threshold, an object UE may reject the S-RTT request because the S-RTT exacerbates channel congestion and a UE related to the S-RTT does not get the transmission opportunity related to S-RTT.

For example, if the above reasons do not apply, the object UE may accept the S-RTT request.

Furthermore, an object UE may accept or reject the S-RTT request according to the type of the object UE. For example, if the type of the object UE is an RSU, the object UE may accept the S-RTT request without conditions, or if the type of the object UE is a UE other than an RSU, the object UE may decide to accept the request in consideration of the rejection condition and the like.

For example, acceptance and rejection of the S-RTT request may be transmitted through an SPP message or may be signaled to the target UE through PSCCH, PC5 RRC, and/or MAC CE transmitted by a server UE.

In this case, a resource for server UE to accept S-RTT request and send the request may be configured through PSCCH or MAC CE transmitted by a target UE, or (pre) configured through PC5 RRC, or may be a resource at the earliest transmittable time determined through sensing of the channel resource after a specific time has passed since the time point when a specific time elapses after the time when an object UE receives the PSCCH transmitted by the target UE, or the time when the object UE receives the PSCCH transmitted by the target UE 1.3) A Target UE Transmits a PRS to a Server UE which Accepts the S-RTT Request For example, other UEs may not be able to use a resource by sensing reservation information for the resource, since the resource necessary for a target UE to transmit a PRS are reserved through the PSCCH transmitted by the target UE, and related reservation information is transmitted through SCI.

For example, a target UE may transmit a PRS at the earliest transmittable time determined through sensing of a channel resource after a specific time has elapsed after the transmission time of the PSCCH transmitted by the target UE, or a time point when a specific time elapses after the transmission time of the PSCCH transmitted by the target UE.

For example, other UEs may not be able to use a resource by sensing reservation information for the resource, since a resource necessary for a target UE to transmit a PRS are reserved through a PSCCH transmitted by a server UE, and related reservation information is transmitted through SCI.

For example, a target UE may transmit a PRS at the earliest transmittable time determined through sensing of channel resources after a specific time has elapsed after a PSCCH transmission time transmitted by a server UE, or a time point when a specific time elapses after the transmission time of the PSCCH transmitted by the server UE Alternatively, for example, a server UE may inform a target UE of resources that the target UE cannot use because the server UE uses or plans to use it. Here, the target UE may transmit a PRS by determining a resource based on sensing among resources excluding the corresponding resource.

Alternatively, for example, a server UE may inform a target UE of a pool of resources that the target UE can use, and in the resource pool, the target UE may select a resource based on sensing and transmit a PRS.

Alternatively, for example, a server UE may cause a target UE to transmit a PRS at a specific time determined by a specific rule according to a PSCCH transmission time point transmitted by the server UE.

Alternatively, for example, if a server UE is an RSU, the server UE may designate transmission or reception resources for all other data or signals transmitted or received by the target UE, including the PRS transmitted by the target UE, to the target UE through PC5 RRC, MAC CE, and/or SCI. This operation may be performed in both cases where the RSU is a UE type or a gNB type. For example, an RSU may be coordinated with a gNB to allocate transmission or reception resources necessary for a target UE to the target UE. Or, for example, an RSU may be equipped with a part of a gNB function to allocate transmission or reception resources to a target UE. In this case, a resource allocated by the RSU may be allocated to the target UE in the form of a resource pool and selected from the target UE based on sensing of the target UE in the resource pool, or may be directly allocated from the target UE.

In this case, information (e.g., ID) on the server UE that is to receive the PRS may be signaled through the PSCCH transmitted by the target UE. Through this, it is known that a specific PRS is transmitted to a specific server UE, and other UEs may ignore the PRS without receiving it.

1.4) A Server UE Transmits a PRS after the Server UE Receives a PRS from a Target UE For example, a resource required for a server UE to transmit a PRS is reserved through a PSCCH transmitted by a target UE, and the related reservation information is transmitted through SCI, so that other UEs are prevented from using the resource by sensing the reservation information for the resource.

For example, a target UE may signal resource reservation information through a PC5 RRC or a MAC CE.

For example, a server UE may transmit a PRS at the earliest transmittable time determined through sensing of the channel resource, when a specific time has elapsed since the reception of a PSCCH or a PRS transmitted by the target UE, or after a specific time has elapsed since the reception of a PSCCH or a PRS transmitted by the target UE.

Alternatively, a target UE may inform a server UE of resources that the server UE cannot use because the target UE uses or plans to use it. Here, the server UE may transmit a PRS by determining a resource based on sensing among resources excluding the corresponding resource.

Alternatively, for example, a target UE may inform a server UE of a pool of resources that the server UE can use, and in the resource pool, the server UE may select a resource based on sensing and transmit a PRS.

Alternatively, for example, a target UE may cause a server UE to transmit a PRS at a specific time determined by a specific rule according to the transmission time of a PSCCH transmitted by the target UE.

In this case, information (e.g., ID) on a target UE to receive a PRS may be signaled through a PSCCH transmitted by a server UE. Through this, it is known that a specific PRS is transmitted to a specific target UE, and other UEs may ignore the PRS without receiving it.

1.5) A Server UE Transmits a Time Difference Between a Time Point when the Server UE Transmits a PRS (t3) and a Time Point when the Server UE Receives a PRS from a Target UE (t2) (Server UE RX-TX Time Difference=t2−t3) to the Target UE For example, the time difference may be transmitted through a SPP message, or signaled to a target UE through a PSCCH which the server UE transmits, a PC5 RRC, and/or a MAC CE.

For example, a resource which a server UE needs to transmit the time difference is reserved through a PSCCH which a target UE transmits, and since the related reservation information is transmitted through SCI, other UEs may not be able to use the resource by sensing the reservation information for the resource.

For example, a target UE may signal resource reservation information through a PC5 RRC or a MAC CE.

For example, a server UE may transmit the time difference at the earliest transmittable time determined through sensing of the channel resource, when a specific time has elapsed since the reception of a PSCCH or a PRS transmitted by a target UE, or after a specific time has elapsed since the reception of a PSCCH or a PRS transmitted by a target UE.

Alternatively, for example, a target UE may inform a server UE of resources that the server UE cannot use because the target UE uses or plans to use it. Here, the server UE may transmit a time difference by determining a resource based on sensing among resources excluding the corresponding resource.

Alternatively, for example, a target UE may inform a server UE of a pool of resources that the server UE can use, and within the resource pool, the server UE may select a resource based on sensing and transmit a time difference.

Alternatively, for example, a target UE may cause a server UE to transmit a time difference at a specific time determined by a specific rule according to the transmission time of a PSCCH transmitted by the target UE.

1.6) A target UE transmits a time difference between a time point when the target UE receives a PRS received from a server UE after it receives a PRS transmitted by the server UE (t4) and a time point when the target UE transmits a PRS through the progress 1.3) (t1) (target UE RX-TX time difference=t4-t1) to the server UE For example, the time difference may be transmitted through a SPP message, or may be signaled through a PSCCH which a target UE transmits, a PC5 RRC, and/or a MAC CE to a server UE.

For example, a resource required for a target UE to transmit a time difference is reserved through a PSCCH transmitted by a server UE, and related reservation information is transmitted through SCI, so that other UEs may not be able to use the resource by sensing the reservation information for the resource.

For example, a server UE may signal resource reservation information through a PC5 RRC or a MAC CE.

For example, a target UE may transmit a time difference at a time point when a specific time elapses after the target UE receives a PSCCH, a PRS, and/or a time difference in 1.5) process transmitted by a server UE, or at the earliest transmittable time determined through sensing of channel resources after a specific time has elapsed after the target UE receives a PSCCH, a PRS, and/or a time difference in the 1.5) process transmitted by a server UE.

Alternatively, for example, a server UE may inform a target UE of resources that the target UE cannot use because the server UE uses or plans to use it. Here, the target UE may transmit a time difference by determining a resource based on sensing among resources excluding the corresponding resource.

Alternatively, for example, a server UE may inform a target UE of a pool of resources that the target UE can use, and within the resource pool, the target UE may select a resource based on sensing and transmit a time difference.

Alternatively, for example, a server UE may cause a target UE to transmit a time difference at a specific time determined by a specific rule according to the transmission time of a PSCCH transmitted by the server UE.

Step 1.6) may be omitted when only a target UE calculates a distance and a server UE does not need to calculate a distance.

1.7) The target UE and the server UE calculate the distance between each other.

For example, a time distance between a target UE and a server UE may be calculated according to Equation 2.

time distance between a target UE and a server UE=
(target UE RX-TX thne differece)+(server UE
RX-TX time difference [Equation 2]

For example, according to Equation 3, a value obtained by dividing a time distance between a target UE and a server UE by the speed of light corresponds to a mutual physical distance between the target UE and the server UE.

physical distance between a target UE and a server
UE=(time distance between a target UE and a
server UE)/speed of light [Equation 3]

For example, when step 1.6) is omitted, the process of calculating a distance by a server UE may be omitted.

Figure 17:
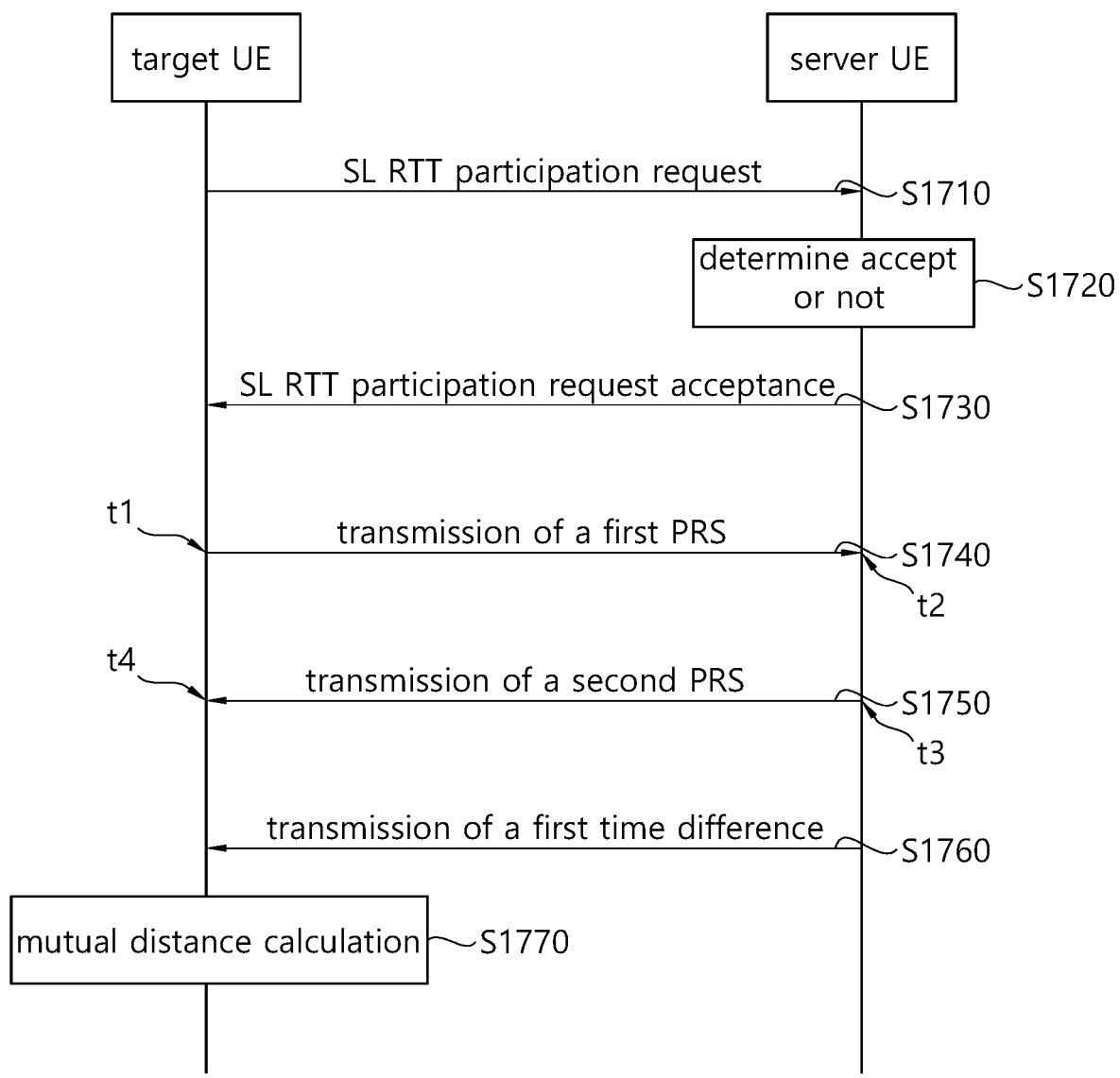
FIG. 17 shows a single server-based S-RTT procedure according to an embodiment of the present disclosure.

FIG. 17 shows a single server-based S-RTT procedure according to an embodiment of the present disclosure. The embodiment of FIG. 17 may be combined with various embodiments of the present disclosure.

Referring to FIG. 17, in step S1710, a target UE may request a server UE to participate in SL RTT. For example, the target UE may transmit a request to participate in the SL RTT to the server UE.

In step S1720, the server UE may determine whether to accept the request for participation in the SL RTT. For example, the server UE may accept the request for participation in the SL RTT based on a measurement value of reference signal received power (RSRP) for a demodulation reference signal (DMRS) related to a first PSCCH transmitted by the first UE, a DMRS related to a PSSCH transmitted by the first UE, and/or a DMRS related to a PSBCH. For example, the server UE may accept the request for participation in the SL RTT based on a priority related to the first UE and the priority of the service related to the second UE. For example, the server UE may accept the request for participation in the SL RTT based on the reliability of the second UE's own location. For example, the server UE may accept the request for participation in the SL RTT based on a utilization ratio of a transport channel. For example, the server UE may accept the request for participation in the SL RTT based on a utilization ratio of a transport channel. For example, the server UE may accept the request for participation in the SL RTT based on that the server UE is a road side unit (RSU). For example, the server UE may not accept the request to participate in the SL RTT if it does not correspond to the above reason.

In step S1730, the server UE may accept the request for SL RTT participation. For example, the server UE may transmit information related to acceptance of the SL RTT participation request to the target UE.

In step S1740, the target UE may transmit a first PRS to the server UE. For example, a time point at which the target UE transmits the first PRS to the server UE may be expressed as t1. Also, a time point at which the server UE receives the first PRS may be expressed as t2. In step S1750, the server UE may transmit a second PRS to the target UE.

For example, a time point at which the server UE transmits the second PRS to the target UE may be expressed as t3. In addition, a time point at which the target UE receives the second PRS may be expressed as t4.

In step S1760, the server UE may transmit a first time difference to the target UE. For example, the first time difference may be a time difference between a time point at which the server UE transmits the second PRS to the target UE and a time point at which the server UE receives the first PRS. For example, the first time difference may be expressed as t3−t2.

In step S1770, the target UE may calculate a distance between the target UE and the server UE based on the first time difference and the second time difference. For example, the second time difference may be a time difference between a time point at which the target UE receives the second PRS and a time point at which the target UE transmits the first PRS to the server UE. For example, a value related to the distance between the target UE and the server UE may be a value obtained by subtracting the value related to the first time difference from the value related to the second time difference divided by the speed of light.

2) Multi-Server Based S-RTT 2.1) A Target UE Requests S-RTT Participation from Nearby Object UEs For example, a target UE may signal the S-RTT participation request to object UEs through a higher layer SPP message on the control plane or the user plane, or through a PSCCH, a PC5 RRC, and/or a MAC CE transmitted by the target UE.

Or, for example, a target UE may reduce the delay required for performing S-RTT by transmitting a PRS to object UEs from the beginning without requesting the object UEs to participate.

2.2) Target UEs Accept or Reject the S-RTT Request

For example, each object UE may measure RSRP for a PSCCH/a PSSCH/a PSBCH a DMRS transmitted by a target UE. Here, if the measured value is less than or equal to a (pre)configured threshold, each object UE may determine that a distance between the target UE and each object UE is too far to be conducive to S-RTT participation and may reject the S-RTT request.

Alternatively, for example, each object UE may reject the S-RTT request if the priority of the service provided or provided by each object UE by allocating resources is higher than the priority of the service that the target UE intends to provide or receive through S-RTT.

Alternatively, for example, in consideration of the reliability of its own location, each object UE may determine that it does not know its location accurately enough and reject the S-RTT request if the reliability of its location is less than or equal to a (pre)configured threshold.

Alternatively, for example, if the usage rate of the transport channel is greater than or equal to the (pre)configured threshold, each object UE may reject the S-RTT request because S-RTT exacerbates channel congestion and the UE related to S-RTT does not get a transmission opportunity related to S-RTT.

For example, each object UE may accept the S-RTT request if it does not correspond to the above reasons.

In addition, each object UE may accept or reject the S-RTT request according to the type of each object UE. For example, if the type of each object UE is an RSU, each object UE may accept the S-RTT request without conditions, or if the type of each object UE is a UE other than the RSU, each object UE may decide to accept the request in consideration of the rejection condition and the like.

For example, acceptance and rejection of the S-RTT request may be transmitted through an SPP message or signaled to a target UE through a PSCCH, a PC5 RRC, and/or a MAC CE transmitted by each server UE.

At this time, a resource for each server UE to accept the S-RTT request and transmit the request may be configured through a PSCCH or a MAC CE transmitted by a target UE, or (pre)configured through a PC5 RRC, or may be a resource at a time point when a specific time elapses after a time point when each object UE receives a PSCCH transmitted by the target UE, or at the earliest transmittable time determined through sensing of channel resources after a specific time has elapsed after each object UE receives a PSCCH transmitted by the target UE.

With respect to a resource for each server UE to transmit a response to a S-RTT request, each server UE may use different resources in the time and frequency domain, when all server UEs use the same resource in the time and frequency domains, each server UE may transmit a response to the S-RTT request using a code or sequence that is orthogonal to each other.

In order to allocate different resources to each server UE in the time/frequency/code domain as described above, a unique layer-1 or layer-2 ID allocated to each server UE may be used. Alternatively, for example, based on a local group ID temporarily assigned to each server UE performing S-RTT, resources used by each server UE may be allocated to be orthogonal to each other. Alternatively, for example, an orthogonal sequence used by each server UE may be generated based on a local group ID temporarily assigned to each server UE performing S-RTT.

When a target UE grants based on information of each object UE that has accepted a S-RTT request, or when the target UE transmits information about each object UE that has accepted the S-RTT request to a base station, the base station receiving the information may assign the local group ID.

For example, each server UE may transmit a response to the S-RTT request using a PSFCH or a specific channel for transmitting a response to an SL positioning request.

2.3) A target UE sends a PRS to each server UE that has accepted an S-RTT request.

For example, a resource required for a target UE to transmit a PRS is reserved through a PSCCH transmitted by the target UE, and related reservation information is transmitted through SCI, so that other UEs may not be able to use the resource by sensing reservation information for the resource.

For example, a target UE may transmit a PRS at a time point when a specific time elapses after a PSCCH transmission time transmitted by the target UE, or the earliest transmittable time determined through sensing of channel resources after a specific time has elapsed after a PSCCH transmission time transmitted by the target UE.

For example, a resource necessary for a target UE to transmit a PRS is reserved through a PSCCH transmitted by a server UE, and related reservation information is transmitted through SCI, so that other UEs may not be able to use the corresponding resource by sensing the reservation information for the resource.

For example, a target UE may transmit a PRS at a time point a specific time elapses after a PSCCH transmission time transmitted by a server UE, or the earliest possible transmission time determined through sensing of channel resources after a specific time has elapsed after a PSCCH transmission time transmitted by each server UE.

Alternatively, for example, a server UE may inform a target UE of resources that the target UE cannot use because the server UE uses or plans to use it. Here, the target UE may transmit a PRS by determining a resource based on sensing among resources excluding the corresponding resource.

Alternatively, for example, a server UE may inform a target UE of a pool of resources that the target UE can use, and within the resource pool, the target UE may select a resource based on sensing and transmit a PRS.

Alternatively, for example, each server UE may cause a target UE to transmit a PRS at a specific time determined by a specific rule according to a PSCCH transmission time point transmitted by each server UE.

Alternatively, for example, when each server UE is an RSU, each server UE may designate transmission or reception resources for all other data or signals transmitted or received by a target UE, including a PRS transmitted by the target UE, to the target UE through a PC5 RRC, a MAC CE, and/or SCI. This operation may be performed in both cases where the RSU is a UE type or a gNB type. For example, an RSU may be coordinated with a gNB to allocate transmission or reception resources necessary for a target UE to the target UE. Or, for example, an RSU may be equipped with a part of a gNB function to allocate transmission or reception resources of a target UE. Alternatively, for example, an RSU may allocate a transmission or reception resource necessary for each server UE to non-RSU server UEs among the server UEs. In this case, a resource that an RSU allocates may be allocated to the target UE or each server UE in the form of a pool of resources and selected from a target UE or each server UE, or may be allocated directly from the target UE or a server UE, based on sensing of the target UE or the server UE in the resource pool.

In this case, each server UE that is to receive a PRS shares a common ID (e.g., a group ID), and the group ID is signaled through a PSCCH transmitted by a target UE. Through this, it is known that a specific PRS is transmitted to specific server UEs, and other UEs may ignore the PRS without receiving it.

2.4) After Each Server UE Receives a PRS from a Target UE, Each Server UE Transmits the PRS For example, a resource required for each server UE to transmit a PRS is reserved through a PSCCH transmitted by a target UE, and the related reservation information is transmitted through SCI, so that other UEs may not be able to use the corresponding resource by sensing the reservation information for the resource.

For example, a target UE may signal resource reservation information through a PC5 RRC or a MAC CE.

For example, each server UE may transmit a PRS at a time point when a specific time elapses after the reception of a PSCCH or a PRS transmitted by a target UE or the earliest transmittable time determined through sensing of channel resources after a specific time has elapsed after the reception of a PSCCH or a PRS transmitted by a target UE.

Alternatively, for example, a target UE may inform each server UE of resources that each server UE cannot use because the target UE uses or plans to use it. Here, each server UE may transmit a PRS by determining a resource based on sensing among resources excluding the corresponding resource.

Alternatively, for example, a target UE may inform each server UE of a resource pool that each server UE can use, and may allow each server UE to select a resource based on sensing within the resource pool and transmit a PRS.

Alternatively, for example, a target UE may cause each server UE to transmit a PRS at a specific time determined by a specific rule according to a transmission time of a PSCCH transmitted by the target UE.

For example, resources used by each server UE to transmit a response to an S-RTT request may be different in time and frequency domains.

In order to allocate different resources to server UEs in time/frequency/code domain as above, a unique layer-1 or layer-2 ID assigned to each server UE may be used. Alternatively, for example, based on a local group ID temporarily assigned to each server UE performing S-RTT, resources used by each server UE may be allocated to be orthogonal to each other.

In this case, information (e.g., ID) on a target UE that is to receive a PRS is signaled through a PSCCH transmitted by each server UE. Through this, it is known that a specific PRS is transmitted to a specific target UE, and other UEs may ignore the PRS without receiving it.

2.5) Each Server UE Transmits to a Target UE a Difference (Server UE RX-TX Time Difference=t2−t3) Between a Time Point at which they Transmit a PRS (t3) and a Time Point at which they Receive a PRS from the Target UE (t2)

For example, the time difference may be transmitted through an SPP message or signaled to a target UE through a PSCCH, a PC5 RRC, and/or a MAC CE transmitted by each server UE.

For example, a resource required for each server UE to transmit the time difference is reserved through a PSCCH transmitted by a target UE, and related reservation information is transmitted through SCI, so that other UEs may not be able to use the corresponding resource by sensing the reservation information for the corresponding resource.

For example, a target UE may signal resource reservation information through a PC5 RRC or a MAC CE.

For example, each server UE may transmit a PRS at a time point when a specific time elapses after a PSCCH or a PRS reception time transmitted by a target UE or the earliest transmittable time determined through sensing of channel resources after a specific time has elapsed after receiving a PSCCH or a PRS transmitted by the target UE.

Alternatively, for example, a target UE may inform each server UE of resources that each server UE cannot use because the target UE uses or plans to use it. Here, each server UE may transmit a time difference by determining a resource based on sensing among resources excluding the corresponding resource.

Alternatively, for example, a target UE may inform each server UE of a resource pool that each server UE can use, and within the resource pool, each server UE may select a resource based on sensing and transmit a time difference.

Alternatively, for example, a target UE may cause each server UE to transmit a time difference at a specific time determined by a specific rule according to the transmission time of a PSCCH transmitted by the target UE.

For example, resources used by each server UE to transmit the time difference may be different in time and frequency domains.

For example, in order to allocate different resources to each server UE in time/frequency/code domain as above, a unique layer-1 or layer-2 ID assigned to each server UE may be used. Alternatively, for example, based on a local group ID temporarily assigned to each server UE performing S-RTT, resources used by each server UE may be allocated to be orthogonal to each other.

2.6) A target UE transmits a time difference (target UE RX-TX time difference=t4−t1) between a time point when the target UE receives each PRS received from each of the server UEs after the target UE receives each PRS transmitted by each of the server UEs (t4) and a time point (t1) at which the target UE transmits a PRS to each server UE.

For example, the time difference may be transmitted through an SPP message or signaled to a server UE through a PSCCH, a PC5 RRC, and/or a MAC CE transmitted by a target UE.

For example, a resource required for a target UE to transmit a time difference is reserved through a PSCCH transmitted by each server UE, and the related reservation information is transmitted through SCI, so that other UEs may not be able to use the corresponding resource by sensing the reservation information for the corresponding resource.

For example, a server UE may signal resource reservation information through a PC5 RRC or a MAC CE.

For example, a target UE may transmit a time difference at a time point when a specific time elapses after the target UE receives a time difference in a PSCCH, a PRS, and/or 2.5) process transmitted by a server UE or at the earliest transmittable time determined through sensing of channel resources after a specific time has elapsed after the target UE receives a time difference in a PSCCH, a PRS, and/or 2.5) process transmitted by the server UE.

Alternatively, for example, each server UE may inform a target UE of resources that the target UE cannot use because each server UE uses or plans to use it. Here, the target UE may transmit a time difference by determining a resource based on sensing among resources excluding the corresponding resource.

Alternatively, for example, each server UE may inform a target UE of a pool of resources that the target UE can use, and within the resource pool, the target UE may select a resource based on sensing and transmit a time difference.

Alternatively, for example, each server UE may cause a target UE to transmit a time difference at a specific time determined by a specific rule according to a PSCCH transmission time transmitted by each server UE.

For example, resources used by each server UE to transmit a time difference to a target UE may be dealt with in time and frequency domains.

For example, in order to allocate different resources to each server UE in time/frequency/code domain as described above, a unique layer-1 or layer-2 ID allocated to each server UE may be used. Alternatively, for example, based on a local group ID temporarily assigned to each server UE performing S-RTT, resources used by each server UE may be allocated to be orthogonal to each other.

For example, step 2.6) may be omitted when only a target UE calculates a distance and a server UE does not need to calculate the distance.

2.7) A target UE calculates a distance between each server UE and based on this, calculates the location of the target UE.

For example, a time distance between a target UE and each server UE may be calculated according to Equation 4, respectively.

$$\text{time distance between a target UE and a server UE} = \text{(target UE RX-TX time difference)} + \text{(server UE RX-TX time difference)} \quad \text{[Equation 4]}$$

For example, according to Equation 5, a value obtained by dividing a time distance between a target UE and each server UE by the speed of light corresponds to a mutual physical distance between the target UE and each server UE.

$$\text{physical distance between a target UE and a server UE} = \text{(time distance between a target UE and a server UE)}/\text{speed of light} \quad \text{[Equation 5]}$$

According to an embodiment of the present disclosure, when a plurality of server UEs simultaneously transmit a signal to a target UE the above time distance may be used as a timing advance value for matching temporal synchronization of signals received by the target UE from a plurality of server UEs. That is, when each server UE transmits a signal to a target UE, if the signal is transmitted in advance for each time distance corresponding to each server UE, the target UE can receive the signals of all server UEs within the same time or a certain time period, even if a short CP length is used, deterioration of reception performance can be prevented regardless of delay spread of a channel.

For example, in relation to the location of the target UE, when a circle is drawn with the distance from the target UE as the radius of the plurality of server UEs as the radius, the portion where the plurality of circles intersect may be the location candidate of the target UE.

In this case, for example, when the absolute position of a server UE is known, a target UE may calculate its absolute position using the above method. In particular, when server UEs are RSUs, RSU IDs may be allocated in advance through coordination between RSUs, and the RSU IDs may be shared with each other. Or, for example, an RSU ID is (pre)configured or predefined, and the RSU ID information may be known to a server UE through a channel, a signal, or information that the server UE sends to a target UE. A server UE may know the absolute position of the RSU corresponding to the RSU ID through the RSU ID, and based on this, the absolute position of a target UE may be calculated.

Figure 18:
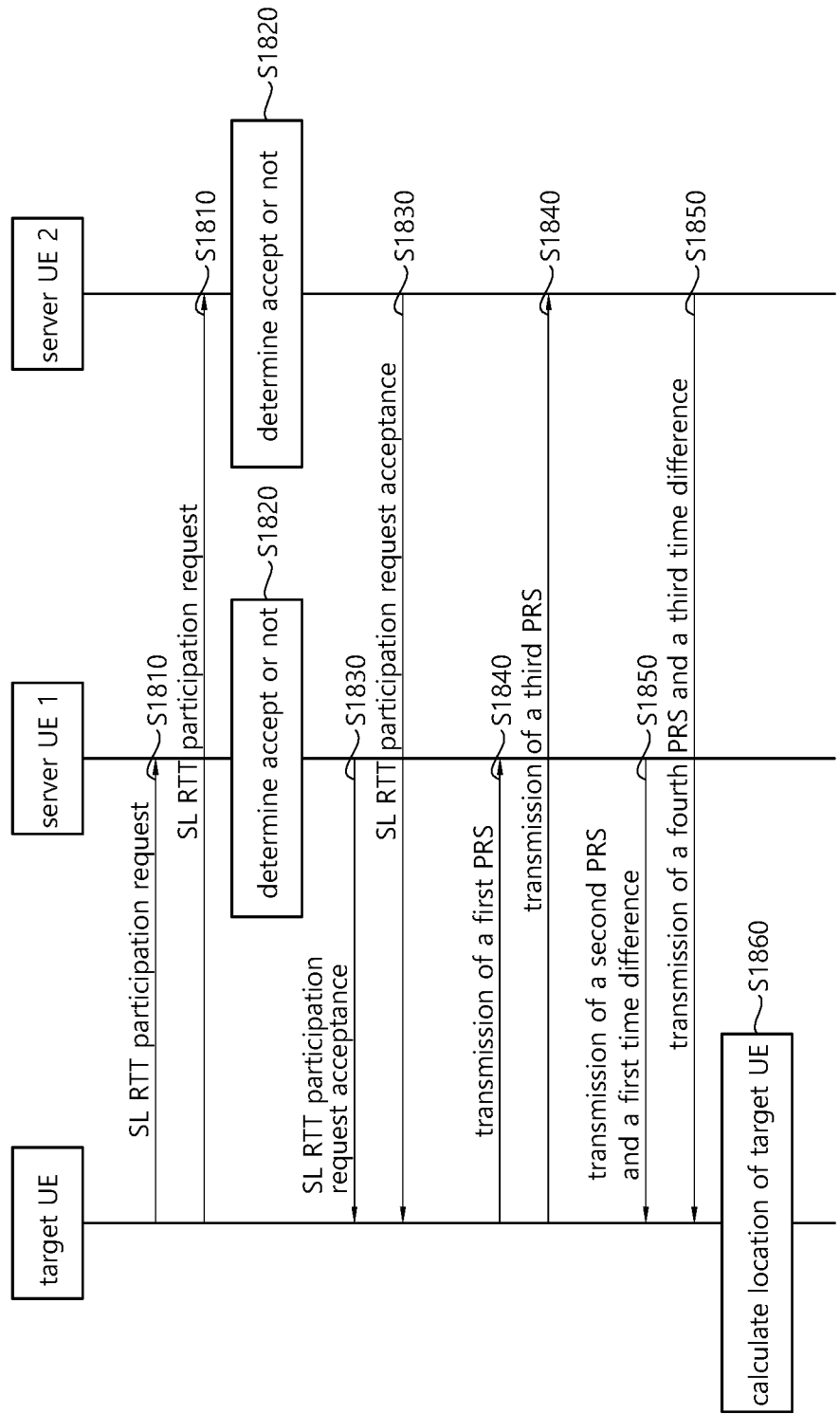
FIG. 18 shows a multi-server based S-RTT procedure according to an embodiment of the present disclosure.

FIG. 18 shows a multi-server based S-RTT procedure according to an embodiment of the present disclosure. The embodiment of FIG. 18 may be combined with various embodiments of the present disclosure.

Referring to FIG. 18, in step S1810, a target UE may request a server UE 1 and a server UE 2 to participate in SL RTT. For example, the target UE may transmit a request to participate in the SL RTT to the server UE 1 and the server UE 2.

In step S1820, the server UE 1 and/or the server UE 2 may determine whether to accept the SL RTT participation request, respectively. For example, the server UE 1 and/or the server UE 2 may accept the SL RTT participation request based on a reference signal received power (RSRP) measurement value for a demodulation reference signal (DMRS) related to a first PSCCH transmitted by the first UE, a DMRS related to a PSSCH transmitted by the first UE, and/or a DMRS related to a PSBCH. For example, the server UE 1 and/or the server UE 2 may accept the SL RTT participation request based on the priority related to the first UE and the priority of the service related to the second UE. For example, the server UE 1 and/or the server UE 2 may accept the request for participation in the SL RTT based on the reliability of the location of the second UE. For example, the server UE 1 and/or the server UE 2 may accept the request for participation in the SL RTT based on a utilization ratio of a transport channel. For example, the server UE 1 and/or the server UE 2 may accept the request for participation in the SL RTT based on a utilization ratio of a transport channel. For example, the server UE 1 and/or the server UE 2 may accept the request for participation in the SL RTT based on the fact that the server UE is a road side unit (RSU). For example, if the above reason does not apply, the server UE 1 and/or the server UE 2 may not accept the SL RTT participation request.

In step S1830, the server UE 1 and/or the server UE 2 may accept the request for SL RTT participation. For example, the server UE 1 and/or the server UE 2 may transmit information related to acceptance of the SL RTT participation request to the target UE, respectively.

In step S1840, the target UE may transmit a first PRS to the server UE1. Also, the target UE may transmit a third PRS to the server UE 2. In step S1850, the server UE 1 may transmit a second PRS to the target UE. In addition, the server UE 2 may transmit a fourth PRS to the target UE.

In step S1850, the server UE 1 may transmit a second PRS to the target UE. In addition, the first time difference may be transmitted to the target UE. For example, the first time difference may be a time difference between a time point at which the server UE 1 transmits the second PRS to the target UE and a time point at which the server UE 1 receives the first PRS. For example, the server UE 2 may transmit a fourth PRS to the target UE. In addition, a third time difference may be transmitted to the target UE. For example, the third time difference may be a time difference between a time point at which the server UE 2 transmits the fourth PRS to the target UE and a time point at which the server UE 2 receives the third PRS.

In step S1860, the target UE may calculate the location of the target UE based on the first time difference, the third time difference, the second time difference, and the fourth time difference. For example, the second time difference may be a time difference between a time point at which the target UE receives the second PRS and a time point at which the target UE transmits the first PRS to the server UE. For example, the fourth time difference may be a time difference between a time point at which the target UE receives the fourth PRS and a time point at which the target UE transmits the third PRS to the server UE. For example, the target UE may calculate a first distance between the target UE and the server UE1 from the first time difference and the second time difference. Also, the target UE may calculate a second distance between the target UE and the server UE 2 from the third time difference and the fourth time difference. For example, the target UE may calculate the intersection of a circle drawn with the first distance as a radius with the server UE 1 as a center point and a circle drawn with the second distance as a radius with the server UE 2 as a center point as the location of the target UE.

Figure 19:
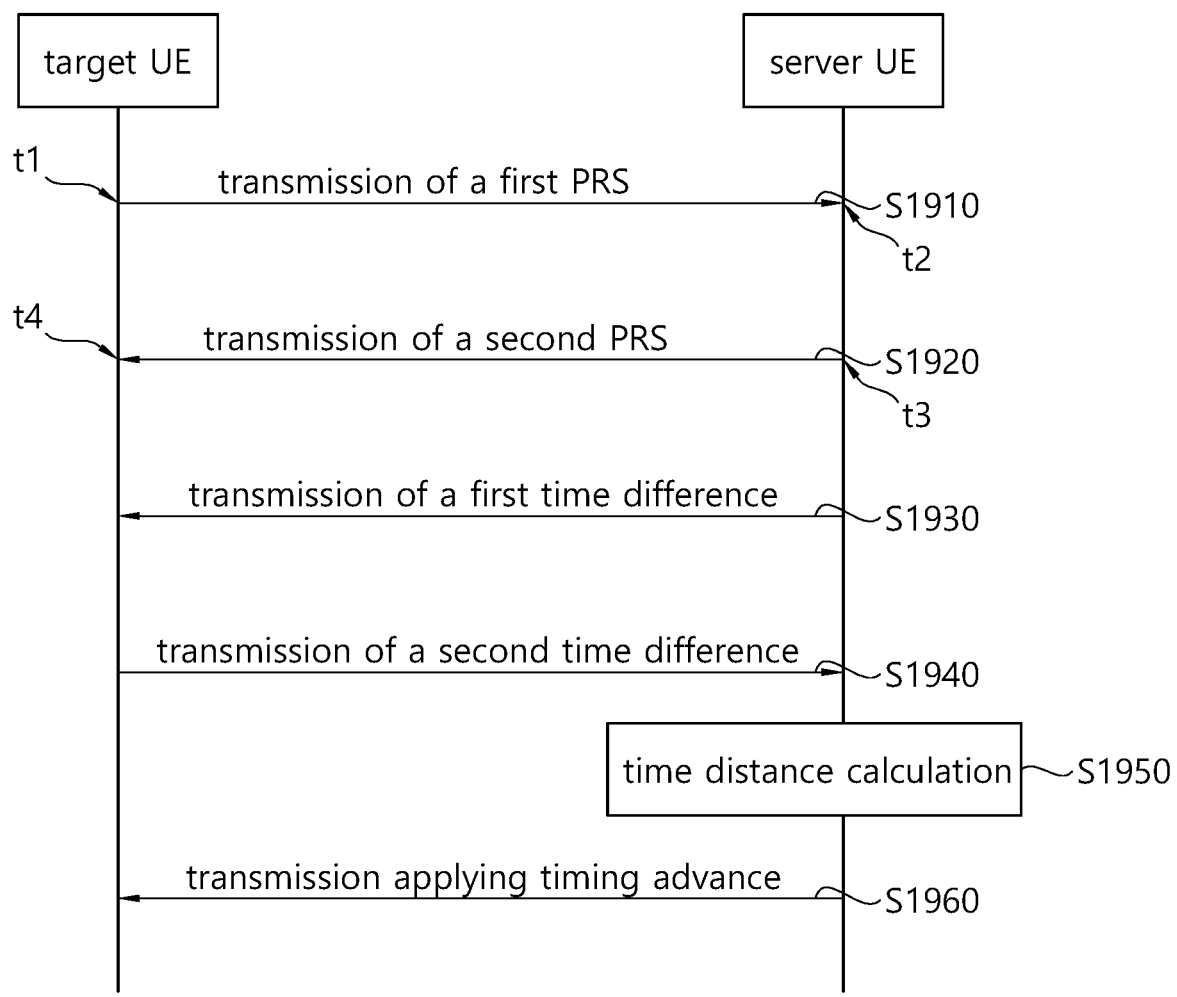
FIG. 19 shows a procedure for using a time distance as a timing advance, according to an embodiment of the present disclosure.

FIG. 19 shows a procedure for using a time distance as a timing advance, according to an embodiment of the present disclosure. The embodiment of FIG. 19 may be combined with various embodiments of the present disclosure.

According to FIG. 19, in step S1910, a target UE may transmit a first PRS to a server UE. For example, a time point when the target UE transmits the first PRS to the server UE may be expressed as t1. Also, a time point at which a server UE receives the first PRS may be expressed as t2.

In step S1920, the server UE may transmit a second PRS to the target UE. For example, a time point at which the server UE transmits the second PRS to the target UE may be expressed as t3. In addition, a time point at which the target UE receives the second PRS may be expressed as t4.

In step S1930, the server UE may transmit a first time difference to the target UE. For example, the first time difference may be a time difference between a time point at which the server UE transmits the second PRS to the target UE and a time point at which the server UE receives the first PRS. For example, the first time difference may be expressed as t3−t2.

In step S1940, the target UE may transmit a second time difference to the server UE. For example, the second time difference is a time difference between a time point when the target UE receives the second PRS and a time point when the target UE transmits the first PRS to the server UE. For example, the second time difference may be expressed as t4−t1.

In step S1950, the server UE may calculate a time distance between the target UE and the server UE, based on the first time difference and the second time difference. In step S1960, when the server UE transmits to the target UE, the server UE may transmit by applying the time distance as a timing advance. For example, the server UE may transmit as early as the time distance when transmitting to the target UE. This allows the target UE to successfully receive regardless of the delay spread.

According to an embodiment of the present disclosure, in the course of single server S-RTT and multi-server S-RTT, by raising the transmission priority of a resource for PRS transmission over a resource for transmitting other channels or signals, the priority for the SL positioning service may be adjusted.

In the present disclosure, a single server-based S-RTT method for estimating the distance between UEs only by communication between sidelink UEs and a multi-server-based S-RTT method for estimating the location of a target UE based on distance measurement with a plurality of UE are proposed. The proposed method has the advantage of minimizing the time delay required for position estimation, by eliminating the time delay required to perform communication with a base station, MME or LCS server in order to estimate the location of a target UE, and using only communication between UEs. In addition, an efficient resource allocation method for transmitting a time difference between S-RTT request, response (acceptance and rejection), a PRS, PRS transmission and/or reception transmitted by each UEs is proposed.

Figure 20:
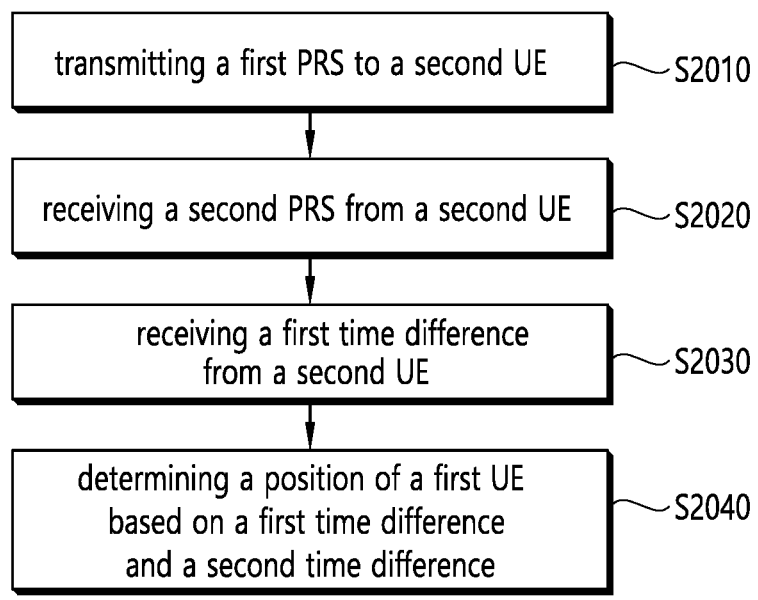
FIG. 20 shows a procedure in which a first user equipment (UE) performs positioning of the first UE according to an embodiment of the present disclosure.

FIG. 20 shows a procedure in which a first user equipment (UE) performs positioning of the first UE according to an embodiment of the present disclosure. The embodiment of FIG. 20 may be combined with various embodiments of the present disclosure.

Referring to FIG. 20, in step S2010, a first user equipment (UE) may transmit a first positioning reference signal (PRS) to a second UE. In step S2020, the first UE may receive a second PRS from the second UE. In step S2030, the firs UE may receive a first time difference from the second UE. In step S2040, the first UE may determine a position of the first UE based on the first time difference and a second time difference. For example, the first time difference may be a time difference between a time when the second UE transmits the second PRS to the first UE and a time when the second UE receives the first PRS, and the second time difference may be a time difference between a time when the first UE receives the second PRS and a time when the first UE transmits the first PRS to the second UE.

For example, a value related to the first time difference and the second time difference may be a value obtained by subtracting a value related to the first time difference from a value related to the second time difference.

For example, additionally, the first UE may transmit a request for a sidelink (SL) round trip time (RTT) for the positioning to the second UE; and receive an acceptance for the request from the second UE.

For example, the request may be transmitted to the second UE through at least one of a first sidelink positioning protocol (SPP) message transmitted by the first UE, a first physical sidelink control channel (PSCCH) transmitted by the first UE, a first PC5 radio resource control (RRC) message transmitted by the first UE, and/or a first medium access control (MAC) control element (CE) transmitted by the first UE, and the acceptance for the request may be transmitted through at least one of a second SPP message transmitted by the second UE, a second PSCCH transmitted by the second UE, a second PC5 RRC message transmitted by the second UE, and/or a second MAC CE transmitted by the second UE.

For example, additionally, the first UE may transmit a first PSCCH to the second UE; and receive a second PSCCH from the second UE. For example, the first PSCCH may include a second identifier (ID) related to the second UE, and the second PSCCH may include a first ID related to the first UE.

For example, additionally, the first UE may sense a first resource related to transmission of the first PRS. For example, the first resource may be: a resource at a transmittable time among resources determined based on the result of the sensing; and the earliest resource that exists after a specific time has elapsed from the time of receiving the second PSCCH.

For example, the first PSCCH may include first sidelink control information (SCI), and the first SCI may include reservation information related to transmission of a first PRS.

For example, the first PSCCH may include the first SCI, the first SCI may include information related to a resource pool, and the resource pool may include a resource related to the second PRS.

For example, additionally, the first UE may transmit a third PRS to a third UE; receive a fourth PRS from the third UE; and receive a third time difference from the third UE. For example, the position of the first UE may be determined based on the first time difference, the second time difference, the third time difference and a fourth time difference, the third time difference may be a time difference between a time when the third UE transmits the fourth PRS to the first UE and a time when the third UE receives the third PRS, and the fourth time difference may be a time difference between a time when the first UE receives the fourth PRS and a time when the first UE transmits the third PRS to the third UE.

For example, the first PRS and the third PRS may be: transmitted through the same resource; and transmitted orthogonally based on a second ID related to the second UE and a third ID related to the third UE.

For example, the second ID may include L1 ID or L2 ID of the second UE, and the third ID may include L1 ID or L2 ID of the third ID.

For example, additionally, the first UE may receive information related to an absolute position of the second UE from the second UE; receive information related to an absolute position of the third UE from the third UE; and obtain an absolute position of the first UE based on the position of the first UE, information related to the absolute position of the second UE, and information related to the absolute position of the third UE.

For example, the second UE may be a road side unit (RSU), and wherein the information related to the absolute position of the second UE may be transmitted through an RSU ID related to the RSU.

The above-described embodiment may be applied to various apparatuses to be described below. For example, a processor 102 of a first apparatus 100 may control a transceiver 106 to transmit a first positioning reference signal (PRS) to a second UE 200. And, the processor 102 of the first apparatus 100 may control the transceiver 106 to receive a second PRS from the second UE 200. And the processor 102 of the first apparatus 100 may control the transceiver 106 to receive a first time difference from the second UE 200. And, the processor 102 of the first apparatus 100 may determine a position of the first UE 100 based on the first time difference and a second time difference.

According to an embodiment of the present disclosure, a first user equipment (UE) for performing wireless communication may be proposed. For example, the first UE may comprise: one or more memories storing instructions; one or more transceivers; and one or more processors connected to the one or more memories and the one or more transceivers, wherein the one or more processors execute the instructions to: transmit a first positioning reference signal (PRS) to a second UE; receive a second PRS from the second UE; receive a first time difference from the second UE; and determine a position of the first UE based on the first time difference and a second time difference, wherein the first time difference is a time difference between a time when the second UE transmits the second PRS to the first UE and a time when the second UE receives the first PRS, and wherein the second time difference is a time difference between a time when the first UE receives the second PRS and a time when the first UE transmits the first PRS to the second UE.

According to an embodiment of the present disclosure, an apparatus configured to control a first user equipment (UE) mat be proposed. For example, the apparatus may comprise: one or more processors; and one or more memories operably connectable to the one or more processors and storing instructions, wherein the one or more processors execute the instructions to: transmit a first positioning reference signal (PRS) to a second UE; receive a second PRS from the second UE; receive a first time difference from the second UE; and determine a position of the first UE based on the first time difference and a second time difference, wherein the first time difference is a time difference between a time when the second UE transmits the second PRS to the first UE and a time when the second UE receives the first PRS, and wherein the second time difference is a time difference between a time when the first UE receives the second PRS and a time when the first UE transmits the first PRS to the second UE.

According to an embodiment of the present disclosure, a non-transitory computer-readable storage medium storing instructions may proposed. For example, the instructions, when executed, may cause a first user equipment (UE) to: transmit a first positioning reference signal (PRS) to a second UE; receive a second PRS from the second UE; receive a first time difference from the second UE; and determine a position of the first UE based on the first time difference and a second time difference, wherein the first time difference is a time difference between a time when the second UE transmits the second PRS to the first UE and a time when the second UE receives the first PRS, and wherein the second time difference is a time difference between a time when the first UE receives the second PRS and a time when the first UE transmits the first PRS to the second UE.

Figure 21:
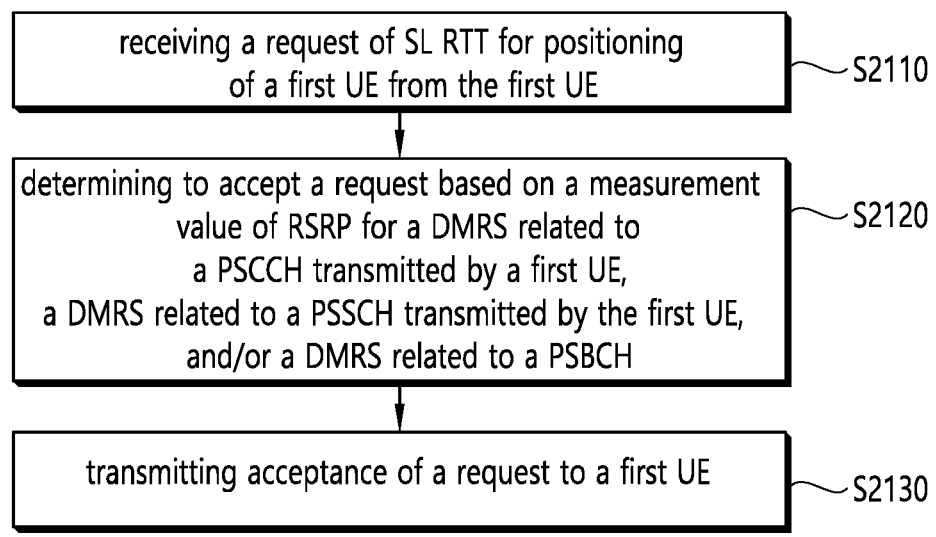
FIG. 21 shows a procedure in which a second user equipment (UE) accepts a request for SL (sidelink) RTT (round trip time), according to an embodiment of the present disclosure.

FIG. 21 shows a procedure in which a second user equipment (UE) accepts a request for SL (sidelink) RTT (round trip time), according to an embodiment of the present disclosure. The embodiment of FIG. 21 may be combined with various embodiments of the present disclosure.

Referring to FIG. 21, in step S2110, a second UE may receive a request of SL RTT for positioning of a first UE from the first UE. In step S2120, the second UE may determine to accept the request based on a measurement value of reference signal received power (RSRP) for a demodulation reference signal (DMRS) related to a physical sidelink control channel (PSCCH) transmitted by the first UE, a DMRS related to a physical sidelink shared channel (PSSCH) transmitted by the first UE, and/or a DMRS related to a physical sidelink broadcast channel (PSBCH). In step S2130, the second UE may transmit acceptance of the request to the first UE.

For example, the request may be transmitted to the second UE through at least one of a first sidelink positioning protocol (SPP) message transmitted by the first UE, a first physical sidelink control channel (PSCCH) transmitted by the first UE, a first PC5 radio resource control (RRC) message transmitted by the first UE, and/or a first medium access control (MAC) control element (CE) transmitted by the first UE, and the acceptance of the request may be transmitted through at least one of a second SPP message transmitted by the second UE, a second PSCCH transmitted by the second UE, a second PC5 RRC message transmitted by the second UE, and/or a second MAC CE transmitted by the second UE.

The above-described embodiment may be applied to various apparatuses to be described below. For example, a processor 202 of a second apparatus 200 may control a transceiver 206 to receive a request of SL RTT for positioning of a first UE 100 from the first UE 100. And, the processor 202 of the second apparatus 200 may determine to accept the request based on a demodulation reference signal (DMRS) related to a physical sidelink control channel (PSCCH) transmitted by the first UE 100, a DMRS related to a physical sidelink shared channel (PSSCH) transmitted by the first UE 100, and/or a measurement value of reference signal received power (RSRP) for DMRS related to a physical sidelink broadcast channel (PSBCH). And, the processor 202 of the second apparatus 200 may control the transceiver 206 to transmit acceptance of the request to the first UE 100.

According to an embodiment of the present disclosure, a second user equipment (UE) for performing wireless communication may be proposed. For example, the second UE may comprise: one or more memories storing instructions; one or more transceivers; and one or more processors connected to the one or more memories and the one or more transceivers, wherein the one or more processors execute the instructions to: receive a request of SL RTT for positioning of a first UE from the first UE; determine to accept the request based on a demodulation reference signal (DMRS) related to a physical sidelink control channel (PSCCH) transmitted by the first UE, a DMRS related to a physical sidelink shared channel (PSSCH) transmitted by the first UE, and/or a measurement value of reference signal received power (RSRP) for DMRS related to a physical sidelink broadcast channel (PSBCH); and transmit acceptance of the request to the first UE.

For example, the request may be transmitted to the second UE through at least one of a first sidelink positioning protocol (SPP) message transmitted by the first UE, a first physical sidelink control channel (PSCCH) transmitted by the first UE, a first PC5 radio resource control (RRC) message transmitted by the first UE, and/or a first medium access control (MAC) control element (CE) transmitted by the first UE, and the acceptance of the request may be transmitted through at least one of a second SPP message transmitted by the second UE, a second PSCCH transmitted by the second UE, a second PC5 RRC message transmitted by the second UE, and/or a second MAC CE transmitted by the second UE.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
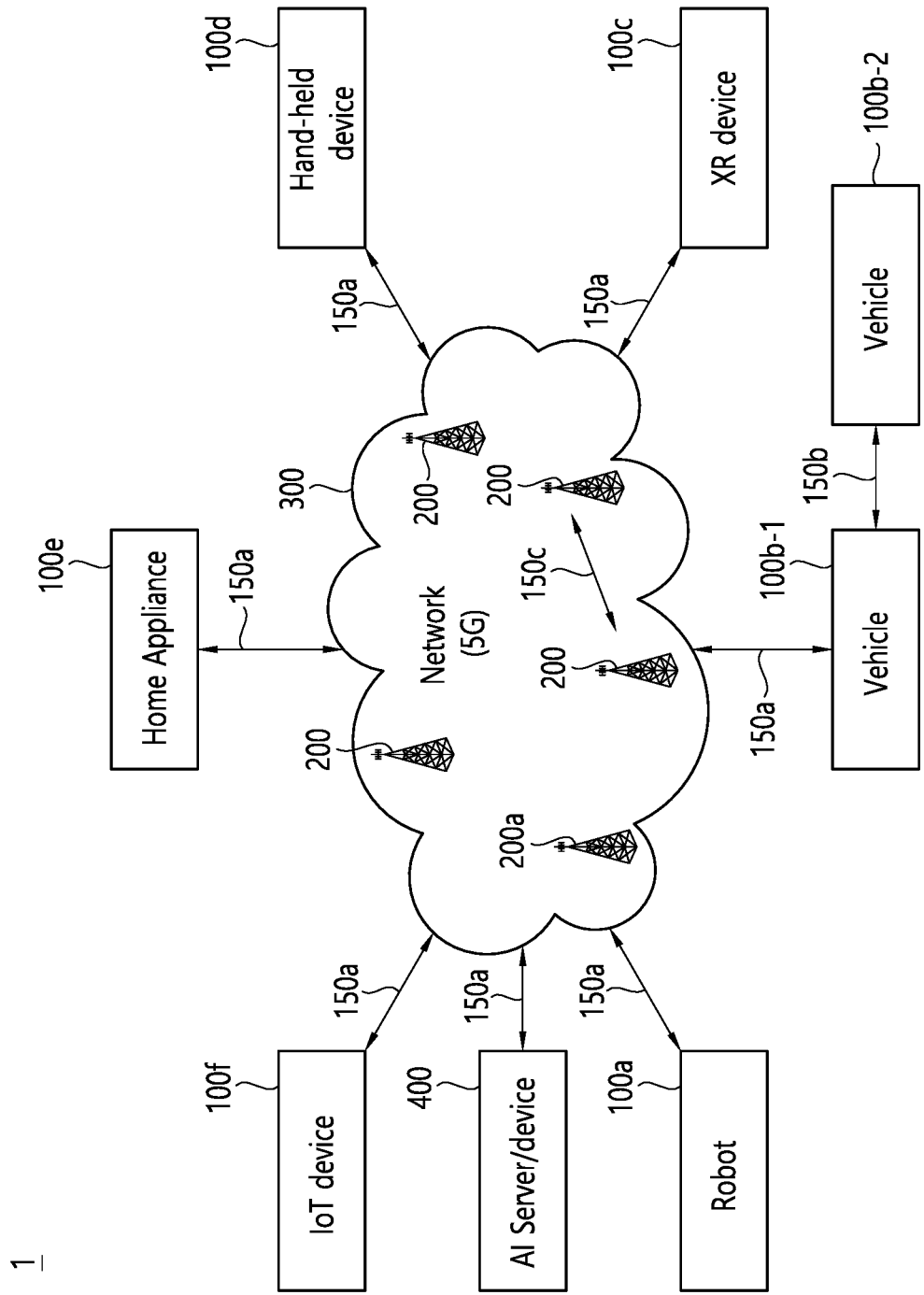
FIG. 22 shows a communication system 1, in accordance with an embodiment of the present disclosure.

FIG. 22 shows a communication system 1, in accordance with an embodiment of the present disclosure.

Referring to FIG. 22, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
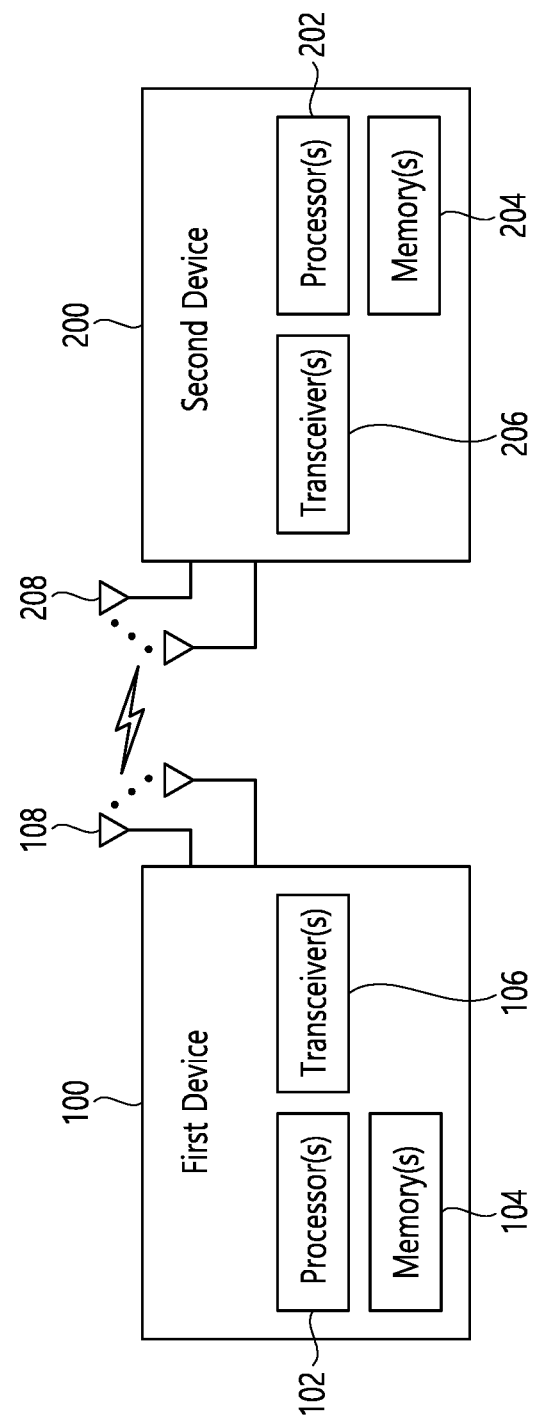
FIG. 23 shows wireless devices, in accordance with an embodiment of the present disclosure.

FIG. 23 shows wireless devices, in accordance with an embodiment of the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 24:
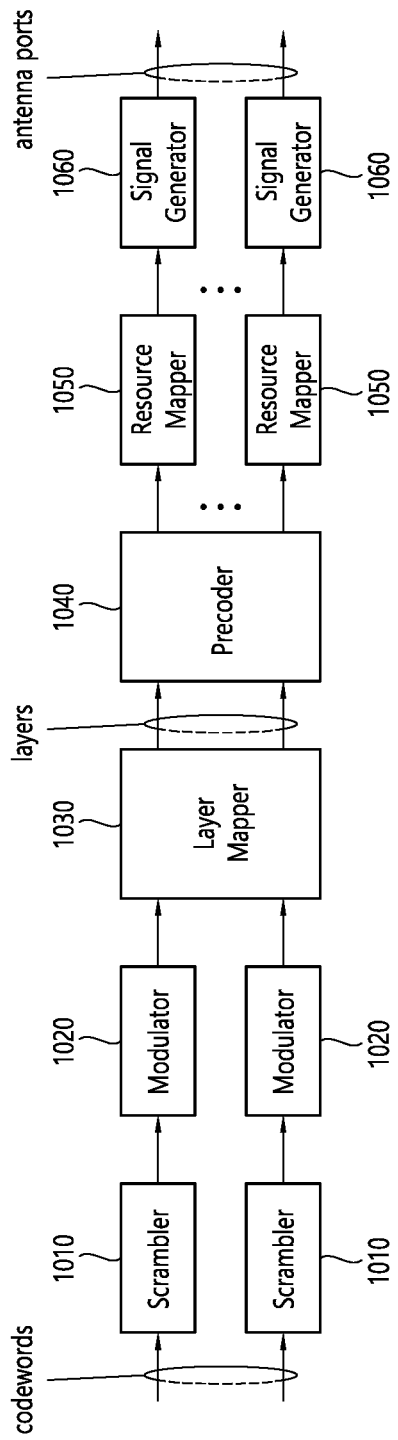
FIG. 24 shows a signal process circuit for a transmission signal, in accordance with an embodiment of the present disclosure.

FIG. 24 shows a signal process circuit for a transmission signal, in accordance with an embodiment of the present disclosure.

Referring to FIG. 24, a signal processing circuit 1000 may include scramblers 1010, modulators 1020, a layer mapper 1030, a precoder 1040, resource mappers 1050, and signal generators 1060. An operation/function of FIG. 24 may be performed, without being limited to, the processors 102 and 202 and/or the transceivers 106 and 206 of FIG. 23. Hardware elements of FIG. 24 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 24. For example, the wireless devices (e.g., 100 and 200 of FIG. 23)

may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
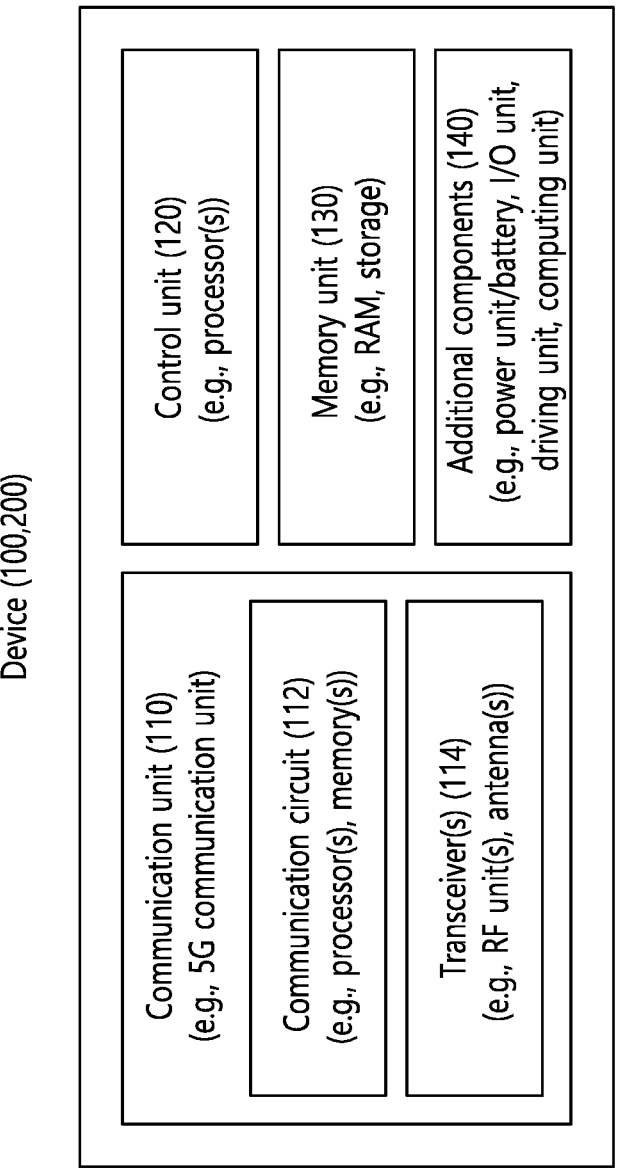
FIG. 25 shows a wireless device, in accordance with an embodiment of the present disclosure.

FIG. 25 shows another example of a wireless device, in accordance with an embodiment of the present disclosure. The wireless device may be implemented in various forms according to a use-case/service (refer to FIG. 22).

Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
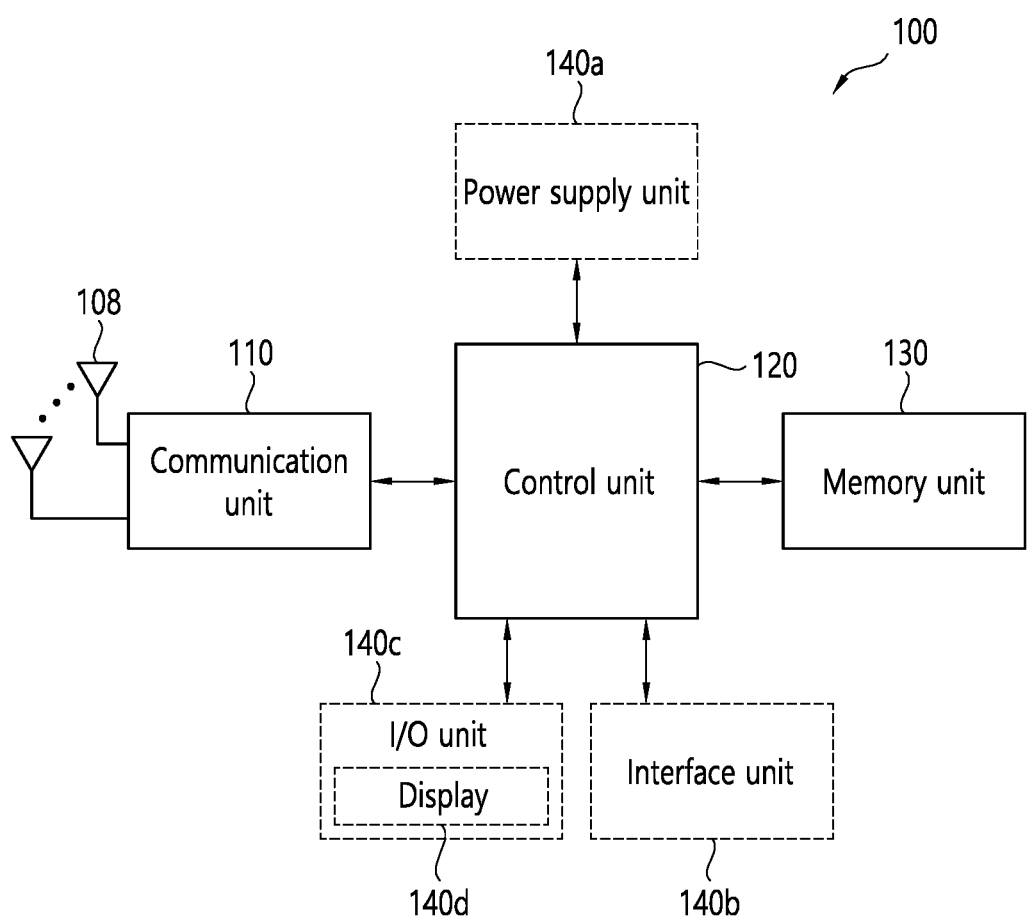
FIG. 26 shows a hand-held device, in accordance with an embodiment of the present disclosure.

FIG. 26 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 25, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 27:
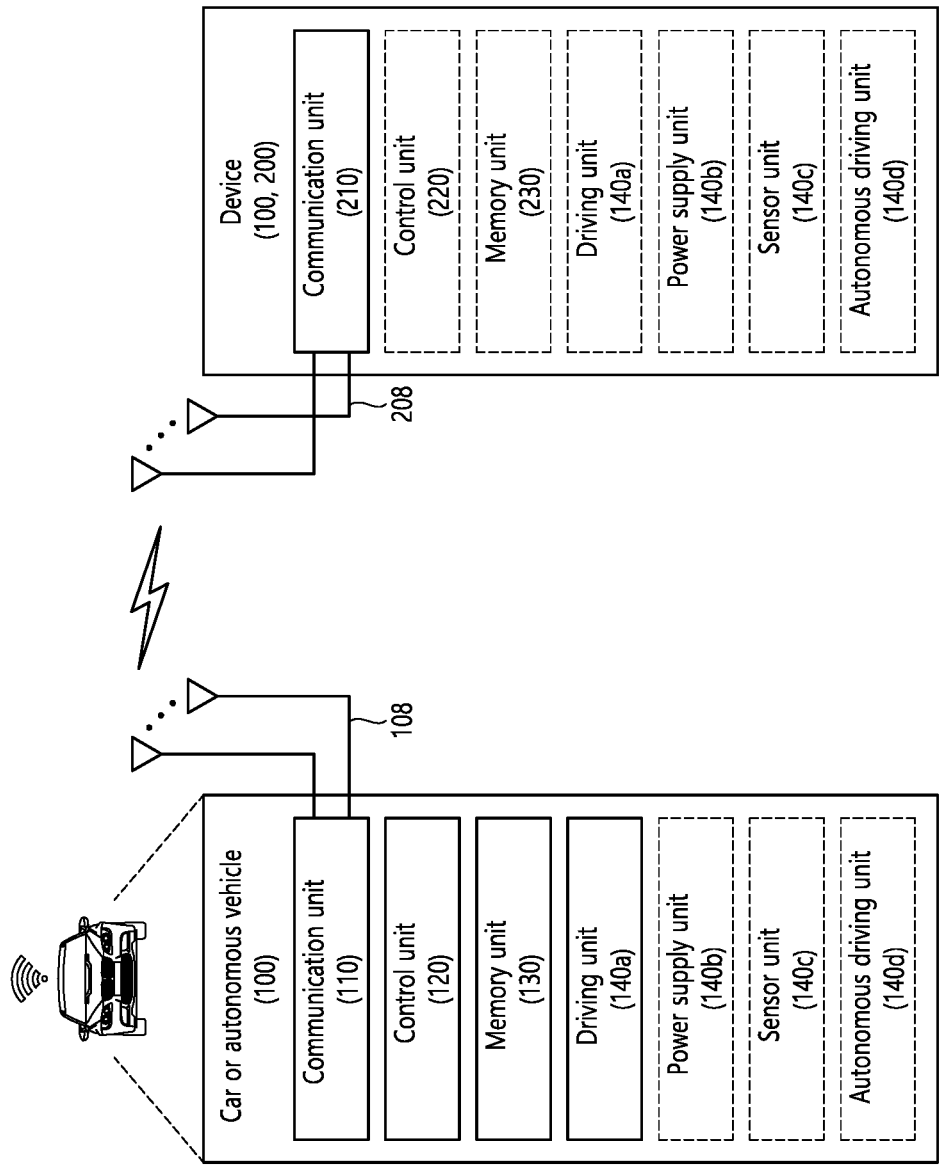
FIG. 27 shows a car or an autonomous vehicle, in accordance with an embodiment of the present disclosure.

FIG. 27 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 27, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first user equipment (UE), positioning of the first UE, the method comprising:
   transmitting, to a second UE, a first physical control channel including a second identifier (ID) related to the second UE and first control information;
   transmitting a first positioning reference signal (PRS) to the second UE;
   receiving, from the second UE, a second physical control channel including a first ID related to the first UE;
   receiving a second PRS from the second UE;
   receiving a first time difference from the second UE; and
   determining a position of the first UE based on the first time difference and a second time difference,
   wherein the first control information includes reservation information related to transmission of the first PRS,
   wherein the first time difference is a time difference between a time when the second UE transmits the second PRS to the first UE and a time when the second UE receives the first PRS, and
   wherein the second time difference is a time difference between a time when the first UE receives the second PRS and a time when the first UE transmits the first PRS to the second UE.

2. The method of claim 1, wherein a value related to the first time difference and the second time difference is a value obtained by subtracting a value related to the first time difference from a value related to the second time difference.

3. The method of claim 1, further comprising:
   transmitting a request for a round trip time (RTT) for the positioning to the second UE; and
   receiving an acceptance for the request from the second UE.

4. The method of claim 3, wherein the request is transmitted to the second UE through at least one of a first positioning protocol message transmitted by the first UE, the first physical control channel transmitted by the first UE, a first PC5 radio resource control (RRC) message transmitted by the first UE, and/or a first medium access control (MAC) control element (CE) transmitted by the first UE, and
   wherein the acceptance for the request is transmitted through at least one of a second positioning protocol message transmitted by the second UE, the second physical control channel transmitted by the second UE, a second PC5 RRC message transmitted by the second UE, and/or a second MAC CE transmitted by the second UE.

5. The method of claim 1, further comprising:
   sensing a first resource related to transmission of the first PRS,
   wherein the first resource is:
   a resource at a transmittable time among resources determined based on the result of the sensing; and
   the earliest resource that exists after a specific time has elapsed from the time of receiving the second physical control channel.

6. The method of claim 1, wherein the first physical control channel includes the first control information, wherein the first control information includes information related to a resource pool, and wherein the resource pool includes a resource related to the second PRS.

7. The method of claim 1, further comprising:
transmitting a third PRS to a third UE;
receiving a fourth PRS from the third UE; and
receiving a third time difference from the third UE,
wherein the position of the first UE is determined based on the first time difference, the second time difference, the third time difference and a fourth time difference,
wherein the third time difference is a time difference between a time when the third UE transmits the fourth PRS to the first UE and a time when the third UE receives the third PRS, and
wherein the fourth time difference is a time difference between a time when the first UE receives the fourth PRS and a time when the first UE transmits the third PRS to the third UE.

8. The method of claim 7, wherein the first PRS and the third PRS are:
transmitted through the same resource; and
transmitted orthogonally based on the second ID related to the second UE and a third ID related to the third UE.

9. The method of claim 8, wherein the second ID includes L1 ID or L2 ID of the second UE, and
wherein the third ID includes L1 ID or L2 ID of the third ID.

10. The method of claim 7, further comprising:
receiving information related to an absolute position of the second UE from the second UE;
receiving information related to an absolute position of the third UE from the third UE; and
obtaining an absolute position of the first UE based on the position of the first UE, information related to the absolute position of the second UE, and information related to the absolute position of the third UE.

11. The method of claim 10, wherein the second UE is a road side unit (RSU), and
wherein the information related to the absolute position of the second UE is transmitted through an RSU ID related to the RSU.

12. A first user equipment (UE) for performing wireless communication, the first UE comprising:
at least one transceiver;
at least one processor; and
at least one memory connected to the at least one processor and storing instructions that, based on being executed, cause the first UE to perform operations comprising:

transmitting, to a second UE, a first physical control channel including a second identifier (ID) related to the second UE and first control information;
transmitting a first positioning reference signal (PRS) to the second UE;
receiving, from the second UE, a second physical control channel including a first ID related to the first UE;
receiving a second PRS from the second UE;
receiving a first time difference from the second UE; and
determining a position of the first UE based on the first time difference and a second time difference,
wherein the first control information includes reservation information related to transmission of the first PRS,
wherein the first time difference is a time difference between a time when the second UE transmits the second PRS to the first UE and a time when the second UE receives the first PRS, and
wherein the second time difference is a time difference between a time when the first UE receives the second PRS and a time when the first UE transmits the first PRS to the second UE.

13. A processing device adapted to control a first user equipment (UE) to perform wireless communication, the processing device comprising:
at least one processor; and
at least one memory connected to the at least one processor and storing instructions that, based on being executed, cause the at least one processor to perform operations comprising:
transmitting, to a second UE, a first physical control channel including a second identifier (ID) related to the second UE and first control information;
transmitting a first positioning reference signal (PRS) to the second UE;
receiving, from the second UE, a second physical control channel including a first ID related to the first UE;
receiving a second PRS from the second UE;
receiving a first time difference from the second UE; and
determining a position of the first UE based on the first time difference and a second time difference,
wherein the first control information includes reservation information related to transmission of the first PRS,
wherein the first time difference is a time difference between a time when the second UE transmits the second PRS to the first UE and a time when the second UE receives the first PRS, and
wherein the second time difference is a time difference between a time when the first UE receives the second PRS and a time when the first UE transmits the first PRS to the second UE.

* * * * *